US011621655B1

(12) United States Patent
Anthony

(10) Patent No.: US 11,621,655 B1
(45) Date of Patent: Apr. 4, 2023

(54) PIEZOELECTRIC MOTOR AND GENERATOR

(71) Applicant: Michael Mark Anthony, Milton, FL (US)

(72) Inventor: Michael Mark Anthony, Milton, FL (US)

( * ) Notice: Subject to any disclaimer, the term of this patent is extended or adjusted under 35 U.S.C. 154(b) by 0 days.

(21) Appl. No.: 17/714,898

(22) Filed: Apr. 6, 2022

(51) Int. Cl.
*H02N 2/10* (2006.01)

(52) U.S. Cl.
CPC .................................. *H02N 2/106* (2013.01)

(58) Field of Classification Search
CPC .......... H01L 41/09; H02N 2/18; H02N 2/106; H02K 53/00; F03G 3/00; F03G 3/02; F03G 3/087; F03G 3/094; F03G 3/097
See application file for complete search history.

(56) References Cited

U.S. PATENT DOCUMENTS

| 3,941,030 | A | * | 3/1976 | Massung | .................. | F03G 3/00 |
| | | | | | | 92/90 |
| 5,221,868 | A | * | 6/1993 | Arman | ....................... | F03G 3/00 |
| | | | | | | 60/716 |
| 10,361,604 | B1 | * | 7/2019 | Skerlan | .................. | H02K 7/061 |
| 2003/0155770 | A1 | * | 8/2003 | Clinch | ....................... | F03G 3/00 |
| | | | | | | 290/1 R |

* cited by examiner

Primary Examiner — Emily P Pham
(74) Attorney, Agent, or Firm — Oltman Flynn & Kubler

(57) ABSTRACT

The apparatus consists of a highly conductive contact disc member preferably an annular circular disc that is attached rigidly to a shaft member with a shaft member collar to rotates freely with the shaft member on a pair of bearings (or bushes), in a pair of housing members. The contact disc member has an even number of piezoelectric crystals attached radially to the circumferential contact disc member electrical contacts to form a symmetric array. An equal number of equal massive members are attached to the other ends of the piezoelectric crystals, again to form, a symmetric array about the rotation axis of the shaft member. Each of the massive members has the same weight for balance. Thus, each massive member is held unto the contact disc member's circumference by a piezoelectric crystal. Each massive member has a diametrically opposite massive member that can balance its weight.

13 Claims, 12 Drawing Sheets

PIEZOELECTRIC MOTOR AND GENERATOR

When either a compressive force (pressure), or, a tension force is applied to a piezoelectric crystal, a voltage develops across the piezoelectric crystal surfaces generated by an offset of its molecules ionic structure from a balanced state. Conversely, when a voltage is applied to the piezoelectric crystal. The piezoelectric crystal responds by elongating and contracting, generating a force. There is a longitudinal mode effect (deformation colinear voltage and applied voltage are linear) and a transverse mode effect (deformation is perpendicular to the voltage).

A cycle of both modes can be designed to cause specific oscillations of the crystal by manipulating a voltage and a current applied to the crystal surfaces to allow a defined motion to be achieved. This defined motion occurs in three states of the crystal. A relaxed normal state, a contracted state, and an extended state. Prior art describes various ways to generate motions using the movements of the piezoelectric crystal when it is actuated by a voltage difference. In all prior art, the force of the piezoelectric crystal itself is the force that causes motion to either rotate a wheel, or to move a plate linearly. However, prior art does not cause a shift in gravitational moments to cause rotations by imbalance of gravitational moments. Instead, prior art relies on complex programmed oscillations of the crystal to perform incremental micro movements by gyrating, or bending to cause millions of micromovements by direct transmittal of their forces to produce a net movement to a desired motion. Prior art focuses on the accuracy of motion of incremental micromovements. This invention does not require a complicated movement by the piezoelectric crystals. Instead, it relies on simple micro-linear actuation that does not require complicated circuits and complicated oscillatory motions of the crystals. Further, prior art relies on a torque produced by the crystal in relation to the moving plate or disc. In this invention, the crystals do not experience any torque, and instead move in a linear manner and do not itself impart a rotational torque.

When a piezoelectric crystal is made, it is charged by an external voltage source to induce a center of change of the generally neutral ionic structure of the crystal. This induces a reorganization of the crystal ionic lattice into a particular "poled" shape. The "poling polarity" determines the behavior of the crystal. Piezoelectric crystals go through a poling hysteresis loop (similar to a magnetization loop) as they are activated, and then, relax. The motion of the piezoelectric crystal is miniscule in the micrometer range, however substantial forces can be exerted by the crystal during expansions and contractions.

DESCRIPTION OF THE FIRST EMBODIMENT OF THE INVENTION

An apparatus using an applied voltage, a gravitational field, piezoelectric crystals, the gravitational balance of massive members about an axis of rotation, and the imbalance of the same to generate motion, is invented. The apparatus can function as a motor and a generator.

In a first and second embodiment of the invention, a motor comprising a rotatable shaft member centered on an axis to rotate in a balanced state; an electrically conductive contact disc member is attached to a shaft member to rotate with the shaft member in a plane perpendicular to its axis of rotation. The contact disc member in a dynamically and statically balanced state under the influence of gravity. The contact disc member has a boundary surface with a multiplicity of surface segments around it, each prepared and plated with layers of metals to form contact disc member electrical contacts. Piezoelectric crystals with at least two surfaces where they are poled are prepared by plating these two surfaces with layers of metals to form piezoelectric crystal electrical contacts. One of each piezoelectric crystal electrical contact is welded to one of each contact disc member electrical contact. Electrically conducting massive members are provided to act as weights. Each massive member has one prepared surface plated with layers of metals to form a massive member electrical contact. Each massive member electrical contact is welded to the other piezoelectric crystal electrical contact such that the massive member, the contact disc member, the piezoelectric crystal, and the shaft member are in a state of dynamic and static balance under the influence of gravity with the shaft member. With the above arrangement, the shaft member holds the contact disc member and an array of piezoelectric crystals with massive members attached to each piezoelectric crystal electrical contact. The contact disc member and the attached piezoelectric crystals and massive members can rotate in a vertical plane perpendicular to the axis of rotation of the shaft member.

Preferably, the array of assembled parts, form a radially symmetric and gravitational balanced system around the axis of rotation. However, an unsymmetric pattern may also be formed to perform the same purpose since any unsymmetric pattern of parts around an axis must also have a center of gravity and at least one balanced orientation under gravity.

An electrical voltage power source with two opposite voltage polarities is provided to power the apparatus. One polarity of the power source is conductively applied to some massive members and the opposite polarity conductively applied to the contact disc member such that, when the power source is turned on, an electrical voltage difference is applied conductively between the two piezoelectric crystal electrical contacts and the piezoelectric crystal receives the applied voltages and can extend and alternatively contract depending on the polarity of the voltage applied. Extending and alternatively contracting piezoelectric crystal moves the massive member radially to create an imbalance on the balanced state on the shaft member. The imbalance will rotate the shaft member with a moment of imbalance. Upon removal of applied voltage, the piezoelectric crystal returns the massive member to its original radial location to remove the imbalance again and the cycle can be repeated to achieve either continuous rotations, or oscillations of the shaft member.

For the purposes of this invention, the following definitions apply.

1. The apparatus is oriented with the right-side of a drawing taken as the right side of the apparatus; the upper quadrants referring to the top two quadrants above the horizontal plane through the axis of rotation; the lower quadrants referring to the lower two quadrants below the horizontal plane through the axis of rotation.
2. Poling voltage, $V_P$, shall mean, the voltage that is inherently applied in a material during manufacture to generate an offset of its electronic structure generating positively and negatively charged surfaces on the material.
3. Massive member, shall mean any electrically conductive matter with a mass.

4. Power source shall mean any electric power source that can apply an applied voltage.
5. Applied voltage, $V_A$, shall mean an electrical voltage from a power source that is applied between the positive and negative surfaces of a poled material. Thus, applied voltage, $V_A$, has polarities of a source, $+V_A$ and $-V_A$. The converse applied voltage, $V_A$, shall mean the opposite polarity to $V_A$, $-V_A$ and $+V_A$.
6. Gravitational charges shall mean electric charges caused by stresses of a gravitational field on a massive member that generate a residual voltage on a piezoelectric crystal.
7. The word gravito-electrostatic implies gravitational and electrostatic in a similar manner to the use of the word electro-magnetic.
8. Piezoelectric crystals shall mean any crystalline material with poled voltages that has the following properties;
   a. The piezoelectric crystal's dimension extends in the direction of a poling voltage when the applied voltage has polarity similar to that of poling voltage. I shall denote this applied voltage of similar polarity as $V_A$. The applied voltage, $V_A$, is a voltage comprises two polarities of the two power source terminals.
   b. The piezoelectric crystal's dimension contracts in the direction of a poling voltage when applied voltage has polarity opposite to that of poling voltage. I shall denote this conjugate applied voltage, as $\overline{V_A}$.
   c. A compressive force applied to the piezoelectric crystal generates voltages with a polarity similar to poling voltage when in poling direction. I shall denote this compression residual voltage as $V_C$.
   d. A tensile force applied to the poling direction generates a voltage with a polarity opposite to poling voltage in poling direction of the piezoelectric crystal. I shall denote this tensile residual voltage as $\overline{V_T}$, where, T, denotes tension.

First Embodiment of the Invention

FIGS. 1 to 9, show the apparatus according to the first embodiment. A positive energy apparatus is described in this invention that uses piezoelectric crystals to create an asymmetry in the right-hand side gravitational moments, $M_R$, and the left-hand side gravitational moments, $M_L$, of massive members, to generate a rotary motion as a motor. In its simplest form, the apparatus consists of a highly conductive contact disc member preferably an annular circular disc that is attached rigidly to a shaft member with a shaft member collar to rotates freely with the shaft member on a pair of bearings (or bushes), in a pair of housing members. The contact disc member has an even number of piezoelectric crystals attached radially to the circumferential contact disc member electrical contacts to form a symmetric array. An equal number of equal massive members are attached to the other ends of the piezoelectric crystals, again to form, a symmetric array about the rotation axis of the shaft member. Each of the massive members has the same weight for balance. Thus, each massive member is held unto the contact disc member's circumference by a piezoelectric crystal. Each massive member has a diametrically opposite massive member that can balance its weight to keep the contact disc member, and hence the shaft member, stationary.

Preferably, the contact disc member and the massive members are made from high density and conductive metals such as, copper, aluminum, tin, zinc, and stainless steel. Preferably, each piezoelectric crystal used by the apparatus is cylindrical in shape and has a piezoelectric crystal body that is cylindrical, a piezoelectric crystal first flat end face, and a piezoelectric crystal second flat end face. Preferably, the piezoelectric crystals used by the apparatus are all of the same dimensions, and all of the same electromechanical characteristics. Preferably the piezoelectric crystals are all made from the same batch of ceramic material to maintain their uniformity.

Advantageously, the piezoelectric cylinder body forms a gap a bridge between a massive member and the contact disc member. The piezoelectric crystal body can be protected by a simple protective sleeve, such as a small silicone tube wrapping around it. Alternatively, the gap between the massive members and the contact disc member can be filled with a soft sealant that will stretch and contract when the piezoelectric moves without hindering its motion. Alternatively, the piezoelectric body is left open to the environment and protected by housing members to allow adequate heat energy flow into, and from, the piezoelectric crystal body.

The piezoelectric crystal is poled in the directions connecting its faces. The piezoelectric crystal may also be any shape whatsoever, as long has it has a piezoelectric body, piezoelectric crystal first flat end face and an opposite facing piezoelectric crystal second flat end face. Preferably, the piezoelectric crystal first flat end face and the opposite facing piezoelectric crystal second flat end face are parallel and perpendicular to the radial direction. Standard massive members electrical contact types of thick film silver, sputtered chrome/gold and electroless nickel contacts can be applied to attach the piezoelectric crystal to the massive members and to the contact disc member. Standard massive members electrical contact types of thick film silver, sputtered chrome/gold and electroless nickel contacts can be applied to the piezoelectric crystal first flat end face and the piezoelectric crystal second flat end face to attach the piezoelectric crystal to contact disc member and to the massive members respectively.

The contact disc member is preferably a thin annular circular metal disc with a cylindrical shaft member collar centered on its to allow the shaft member to be locked to rotate with the contact disc member. Preferably, the contact disc members cylindrical boundary has surface flats to form conductive contact disc members electrical contacts to welded each piezoelectric crystal first flat end face for transmitting an applied voltage from a power source such as a battery, to each piezoelectric crystal first flat end face. One flat face of the contact disc member is used to sliding and conductively make contact with a conductive leaf-spring affixed to the stationary housing. The leaf spring is connected to power leads that transmit one of the polarities of an applied voltage from an electrical power source such as a battery.

Preferably each piezoelectric crystal first flat end face is welded mechanically to the contact disc member boundary surface, to form a symmetric array of radially placed piezoelectric crystals. Each piezoelectric crystal second flat end face is also welded conductively to a massive member to form a matching symmetric array. Preferably, all the piezoelectric crystal first flat end face and the piezoelectric crystal second flat end face are radially spaced and radially distal from each and the center of rotation of the shaft member. Standard massive members electrical contact types consisting, for example, of thick film silver, sputtered chrome/gold and electroless nickel contacts can used to allow each of the crystal's conductive faces to be welded to the contact disc member, and to the massive members, respectively.

The mechanical analog of the arrangement is that the piezoelectric crystals act in a manner similar to small pistons that expand and contract in a radial direction to push and pull the massive members toward and away from the center of rotation, respectively, as needed.

Advantageously, the contact disc member acts as a common conductive contact for one polarity of an applied voltage on all the piezoelectric crystals. Therefore, the contact disc member acts as one of the contact terminals for every piezoelectric crystal in the array, and the massive members form the other contacts.

A brush contact is provided. The brush is a half-circle annular ring made from very fine flexible brushes that conduct electricity easily with minimal resistance. The brush contact can also be a thin metal spring in the form of an annular arc that spans less than $180^0$ in this embodiment. In a second embodiment it spans a little more than 180°. The brush contact can also be made as fine bristles that make contact with only the massive members. The brush contact is attached to one of the housing members as a stationary contact that is radially concentric to the contact disc member to make contact with only selected massive members on either two left quadrants, or two right quadrants of the apparatus. An arrangement of the brush contact can also be used where it contacts any massive in the apparatus. For purposes of explanations of the invention, the brush contact can be placed to only contact massive member on the two right quadrants of the apparatus, for example.

Taking the convention that the apparatus, as oriented above, will rotate in a clockwise direction, then the brush contact will be concentric to the two right-hand quadrants of the assembled apparatus, and making contact with a majority of the massive members on the right-hand quadrants of the apparatus. The brush contact and the contact disc member, form two electric sliding contact terminals for a power source that can supply an actuation applied voltage of polarity, $V_A$, to massive members they contact on the right quadrants, and an applied voltage $-V_A$, to the contact disc member. The piezoelectric crystal's dimension expands in the direction of a poling voltage. The applied voltage, $V_A$, is taken to have a polarity similar to that of poling voltage, $V_P$. Thus, when applied, piezoelectric crystal's dimension expands in the radial direction and the massive members are pushed further away from the center of rotation of the shaft member.

The brush contact, and the leaf spring contact, are attached to their specified locations on the right quadrants, for example, to slidingly and selectively contact massive members that come in contact in only the right quadrants of the motion. Amy other configuration can be used to actuate the piezoelectric crystals. The leaf spring contact and the brush contact are preferably rivetted unto the housing to extend, therefrom, and slidingly and conductively contact the contact disc member and the massive members, respectively, on the right quadrants. This supplies electrical power to the contact disc member, and to selected massive members on the right quadrants only, to transmit the applied voltages to the piezoelectric crystals they are welded to. Advantageously, the expansion and contraction of each piezoelectric crystal can slidingly move the massive members in a radial direction, reducing or selectively, increasing their radial locations. A power switch 140 is also provided to turn on the power source using one leg of the negative terminal as shown in FIG. 10.

A positional encoder that measures the rotation angles can be provided, to rotate with the shaft member and measure the exact position of the rotational disc relative to some reference home position. Preferably, the encoder can be formed from the members of the apparatus without adding cost. The encoder can be designed as part of the contact disc member by laser drilling the contact disc member with many equally spaced, and radially equal encoding holes in a circumferential array that matches and closely and syncs with the rotational disc slots. These encoding holes can be used to pass a narrow light beam such as a diode laser beam to a light-sensitive detectors through the disc contact member to generate signals that can be used to trigger events during operation of the apparatus. The pulses generated by a light sensitive detector as the encoding holes pass the light beam and impinge on a detector, can be used to measure position, speed, and do other functions in a circuit.

Advantageously, an applied voltage, $V_A$, to a massive member, and to the contact disc member, will be transmitted to piezoelectric crystal first flat end face, through the piezoelectric crystals body and to the piezoelectric crystal second flat end face, to extend the piezoelectric crystals on the right quadrants as needed. This applied voltage, $V_A$, will cause the piezoelectric crystals to push the massive members that come into contact with the brush contact in a radial direction away from the central rotational axis of symmetry. As such the location of massive members can be selectively extended on the right quadrant, to break the symmetry of their gravitational moments (radius multiplied by weight) about the axis of the rotation of the shaft member of the contact disc member and cause the shaft member to rotate clockwise. The converse applied voltage $\overline{V_A}$, will cause the piezoelectric crystal to move the massive member radially closer to the axis of rotation, to break the symmetry of their gravitational moments (radius multiplied by weight) about the axis of the rotation of the shaft member of the contact disc member and cause the shaft member to rotate anticlockwise.

To understand the advantage of the apparatus, one simply needs to scale the radial location to realize that the same energy imparted on a piezoelectric crystal to move the massive member, will generate a larger gravitational moment on the scaled apparatus with reduced torque. The torque only depends on the massive member masses and their radial location. Increase the amss of the massive members also changes the torque.

The apparatus can also be configured with one and many contacts making to make contact with one and multiple massive members at the same time.

Let the apparatus be oriented such that axis of rotation of the contact disc member is perpendicular (horizontal) to the gravitational field, G, (vertical). Define four (4) quadrants for the massive members' location on the contact disc member: An Upper left quadrant, an Upper right quadrant, a Lower right quadrant and a Lower left quadrant. As each massive member rotates, it generates gravitational compressive stresses, C, and gravitational tensile stresses, T, caused by the weight of each massive member acting on the piezoelectric cylinder body to generate measurable voltage. The compressive stresses only occur at the upper quadrants (top half) of the apparatus, while tensile stresses only occur at the lower quadrants (bottom half) of the apparatus. The piezoelectric crystal body will generate induced gravitational tension voltages $V_T$, on the piezoelectric crystal body in the two lower quadrants, and also induced an equal but opposite gravitational compression voltages, $V_C$, on the piezoelectric crystal body in the two upper quadrants.

Advantageously, the gravitational field stresses act like a battery in the apparatus with a positive and negative charge induced on diametrically opposed piezoelectric crystal body and thus imposed on massive members. In general practice, the gravitational voltages, (will be referenced indiscriminately as $V_G$), are used in the calibration and manufacture piezoelectric-based scales and piezoelectric-based accelerometers.

When the massive members on the right quadrants are actuated and displaced with an applied voltage, $V_A$, the piezoelectric crystal bodies extend, while the piezoelectric crystal bodies on the left quadrants are un-activated and at a relative relaxed state.

Therefore, an applied voltage, $V_A$ applied between the contact disc member and the brush contact, can cause the massive members attached to piezoelectric crystal body to slightly move (a few micrometers), away from its position of radial symmetry in relation to a diametrically opposite massive member. This causes a difference between the left gravitational moments, $M_L$, and the right gravitational moments, $M_R$. This difference in moments exert a gravitational moment, M, on the shaft member of the apparatus and causes the shaft member to rotate in a clockwise direction of rotation. Since, the left quadrants are in an electrically relaxed state, the gravitational moment, M, will always be manifest to keep the apparatus rotating in a clockwise direction. The imbalance in gravitational moments, M, is caused by the massive members on the right quadrant being extended to a greater radial position than the radial positions of the massive members on the left quadrants. This breaks the symmetry of the apparatus, and the shaft member will rotate accordingly.

Regardless of how many massive members are actuated by an applied voltage, the apparatus will always try to restore the symmetry of the gravitational moments of all the massive members by rotations and by rotational oscillations. It must be noted that angular speed, u, will depend on the imbalance and is limited to a maximum rate at which the massive members that are off-balance fall or rise under the gravitational field's influence. As such the angular speed, co, and the apparatus is limited to some maximum value depending on the radial locations of the massive member, massive member masses, and the amount of dislocation. However, due to the acceleration of gravity, the variation of $V_G$ will not be a true sinusoidal-time-function. It will be a true sinusoidal-space-function at all times. For purposes of this invention, it suffices to describe them as sinusoidal approximations when the apparatus achieves a uniform angular speed, ω.

Preferably, one of, and a combination of, an extension and a contraction, is used for the apparatus for the selected set of massive members actuated by applied voltages. In all cases, n sinusoidal gravitational voltages, $V_G$, will be present in n piezoelectric crystals caused by the gravitational field acting on n-massive members with a phase difference Ø between massive members, given in radians, by the relation, $$\phi = \frac{2\pi}{n}$$

This phases difference of the gravitational voltages, $V_G$, is an alternating voltage that is imposed on each of the massive members. The gravitational voltages, $V_G$, can be used to perform actions on selected piezoelectric crystals to enhance the power of the apparatus. The effect of this arrangement will result in advantages of the invention as will described later. Advantageously, the gravitational field stresses act like a battery in the apparatus with a positive and negative charge induced on diametrically opposed piezoelectric crystal body and thus imposed on massive members.

If the angular position θ, at a time t=0, from start of motion of a given massive member, is given by θ=ωt, where, ω, is the angular speed of rotation. θ=0, at the topmost position, the net gravitational voltage, $V_G$, generated on the actuated massive member, and thus to its piezoelectric crystals will be given by the cumulative effect of all the massive members:

$$V = V_G \sum_{k=1}^{n-1} \sin\left(\omega t + \frac{2\pi}{k}\right)$$

The upper half of the rotational disc will have a net charge opposite to the lower half due to the symmetry of the gravitational field. However, the net applied voltage $V_A$, on all the piezoelectric crystals actuating the massive members on the right quadrants will remain the same, since the upper right quadrant induces an equal and opposite gravitational voltage, $V_G$ to the lower right quadrant on all the actuated and extended piezoelectric crystals combined. Therefore, there is no effect on the combined crystals due to the gravitational potential's effect on the crystals and since all the right massive members on the right quadrants are all connected to the brush contact and to the contact disc member. Therefore, this variation in the gravitational potential residual voltages will all combine and cancel one another. If all the massive members in a left or right quadrant are not tied together by common contacts, then, due to the asymmetry imposed by gravity on the upper and lower quadrants, there will be significant gravitational residual voltages affecting the crystals' performances. These gravitational voltages, $V_G$, can be used to perform functions as will be described in the second embodiment of the invention. It is clear that these, already perform great function in their use for scales and accelerometers. They can also do functions for the apparatus, such as creating a resonant circuit that will oscillate sinusoidally to resonate with the applied voltage and generate more power by tuning the frequencies of rotation. Note that the static potential energy that these voltages create are significant, and in fact are proportional to the weights and accelerations they measure. It is this energy that is stored as potential in a poled crystal.

For example, the alternating charges will exist in all massive members due to their stresses on the crystals. This residual gravitational charge can be directed through a reed relay switch to discharge from the left quadrants into the right quadrants to rhythmically help drive the apparatus to a resonant frequency just as an AC current is pumped by oscillatory frequency to generate more power. In essence it is an n-phase system, for n-massive members.

Note that electronic lighters use this principle of the compressive forces on crystals to generate a current that sparks a lot of energy to burn a fuel.

It is important to note that a tremendous force can generated as the massive members 106 fall due to gravity, and if the massive member 106 is supported by a slide-surface, then, friction can dictate the best angle θ, at which the mass will slide dynamically against a surface, and this is determined by the relation:

$$F = \mu mg = mg \sin \theta$$

where, y, is the frictional coefficient between the disc member slots, g is the gravitational acceleration, and m, is the mass of the massive member, 106. Thus, the "runaway sliding massive member". This angle is important for the maximization of the functional efficiency of the apparatus. As such, the applied voltage, $V_A$, is, preferably applied at least up to an angle of rotation just after a massive member crosses the highest point of motion, and if maintained for an angle of motion of at least 9, degrees of motion, it will fully allow the massive members to shift and fall.

This angle determines the extent of the brush contact's angular extent for the motion to be maintained.

One object of the invention is to provide an apparatus with a symmetric array of piezoelectric crystals, and a symmetric array of massive elements such that a current applied to a subset of said piezoelectric elements breaks the symmetry of the gravitational potential of said symmetric array of massive elements.

Second Embodiment of the Invention

FIG. 10 shows the apparatus according to the second embodiment. An apparatus, is invented to generate motion as a motor, and to act as a generator, using the electric field, the gravitational field, piezoelectric crystals, and massive members. The second embodiment of the invention has exactly the same elements as the first embodiment, except that the brush contact is not needed. As shown in FIG. 10, a positive plate and a negative plate are provided and to connect to a power source such as a battery. A cable connects to the power terminal, $V_A$ of power source and then passes sealingly through housing member to connect to the positive plate and impart a positive charge on it. Another cable connects to the power terminal, $-V_A$ of power source and then passes sealingly through housing members to connect to the negative plate and impart a negative charge on it.

The positive plate and negative plate are designed to seat inside housing member and form concentric charged plate with a small gap separating them from the massive members during their rotational orbits. The positive plate and the negative plate are diametrically opposite and both are centered circumferentially on the horizontal plane of symmetry through the axis of rotation as shown in FIG. 10. A power switch is also provided to turn on the power source using one leg of the negative terminal as shown in FIG. 10.

As shown in FIG. 10, the apparatus has massive members that are configured as described earlier. In this case no applied voltage $V_A$, is applied to any of the massive members. As before, the contact disc member is connected to all the piezoelectric crystal first end faces, and the massive members are again connected to the piezoelectric crystal second end faces. The positive terminal+$V_A$, from the power source, is used to generate a positive charge field on a positive plate 138. The negative terminal $-V_A$, from the power source, is used to generate a negative charge field on a negative plate 138. Both the positive plate and the negative plate, are radially adjacent to the orbit of the massive members, with a small gap separating them from the massive members to allow the massive members to freely orbit without hindrance.

The positive plate is placed symmetrically in a housing member at the junction between the upper left quadrant, and the lower left quadrant, to be shared equally by both quadrants, while the negative plate is placed at the junction between the upper right quadrant, and the lower right quadrant, to be shared equally by both. With this arrangement, the following is true.

a. The piezoelectric crystal generates voltages with a polarity similar to poling voltage when compressive force is applied in poling direction. I shall denote this residual compression voltage as $V_G$. Therefore, gravitational compressive forces G, acting on each massive member in the two upper quadrants will generate positive residual charges.

b. A tensile force applied to the poling direction generates a voltage with a polarity opposite to poling voltage in poling direction of the piezoelectric crystal. I shall denote this tensile residual voltage as $-V_G$, where, G, denotes gravitational field. Therefore, gravitational tensile forces, acting on each massive member 106 in the two lower quadrants will generate negative residual charges, −e.

c. All the residual charges, +e. generated on all the massive members on the upper left quadrant and the upper right quadrant will be for all practical purposes, (baring the miniscule and incalculable difference in the gravitational field between the upper quadrants) will be the same and of the same electric polarity.

d. All the residual charges, −e generated on all the massive members on the lower right quadrant and on the lower right quadrant will be for all practical purposes, (baring the miniscule and incalculable difference in the gravitational field between the upper quadrants) will be the same and of the same electric polarity.

e. Applying a positive charge field, +e, on the positive plate will repel all the massive members with a positive charge field, +e, on the upper left quadrant and the upper right quadrant.

f. Applying a positive charge field, +e, on the positive plate will attract all the massive members with a negative charge field, −e, on the lower left quadrant and the lower right quadrant.

g. Applying a negative charge field, −e, on the negative plate will attract all the massive members with a positive charge field, +e, on the upper right quadrant and the upper left quadrant.

h. Applying a negative charge field, −e, on the negative plate will attract all the massive members with a negative charge field, +e, on the upper left quadrant and the upper right quadrant.

i. The charges reduce to zero as they arrive at the horizontal plane of symmetry, but until then, they have charges induced by their mass.

j. The massive members exactly on the horizontal plane of symmetry through the axis of rotation will have a net zero residual charge and the positive plate and the negative plate will not act on them. These two massive members with a zero charge will pass freely past the positive plate and the negative plate.

With the above arrangement, attractive forces, $F_A$, and repulsive forces $F_R$ acts on the massive members with an attraction and a repulsion cycle that creates rotation. This can generate a rotation in the clockwise direction. When the power switch is turned on, the process of rotation can continue until the power source is deplete. Hence a gravitoelectrostatic motor is created. Advantageously, a torque is generated by the attraction and repulsion. This torque will rotate the massive members and rotate the shaft member in a clockwise direction. It is important to note that this is not a perpetual motion situation, since the prelusive and attractive forces, do work on the massive members. The apparatus according to the second embodiment is similar to an electromagnetic motor which uses magnetic polarity instead of electric polarity. Here, gravitational force polarity is at work. The tensile and compressive forces generate a charge variation between the upper and the lower quadrants resulting in a sinusoidal alternating current on the contact disc member.

To understand the power flow of the apparatus, consider that 20 equal massive members are used by the apparatus. Consider the starting charge of the contact disc member to be zero. Thus, the apparatus only has a static charge that will repel like charges and attract unlike charges without the current flow from the power source to the contact disk member. This allows us to map the flow of charges through the apparatus.

The apparatus behaves as follows:
i. The upper quadrants have 9 unshared members with a net positive charge+$e_m$
ii. The lower quadrants have 9 unshared members with a net negative charge $-e_m$.
iii. The two shared massive members on the horizontal plane separating the upper quadrants and the lower quadrants have zero charges.

Denote $\pm e_D$, as an induced charge on the contact disc member, feF; as an induced charge on the piezoelectric crystal first end face; $\pm e_{F2}$, as an induced charge on the piezoelectric crystal second end face; and; $\pm e_m$, as an induced charge on a massive member.

The sum of all induced charges fem, appear on all the crystals, and thus generate a sum of induced charges+$e_D$, on the contact disc member as follows:

$$\left.\begin{array}{l}[+e_D] \to [-e_{F1} \ldots +e_{F2}]\ldots[-e_m]\\ [-e_D] \to [+e_{F1} \ldots -e_{F2}]\ldots[+e_m]\end{array}\right\} \to [+0_D] \text{ Disc} \quad \text{equation (1)}$$

However, this is an alternating current in the contact disc as it rotates. This generates an alternating magnetic field perpendicular to the rotational motion.

The 9 massive members on the upper quadrants have a net positive charge gain+$e_m$ that must be burrowed from the contact disc member, leaving the contact disc member induced with a negative charge:

$$[-e_p] \to [+e_{F1}\ldots e_{F2}] \ldots [+e_m] \text{Upper Quadrant} \quad \text{equation (2)}$$

As each massive member comes to the horizontal plane of symmetry, it loses all stresses and the burrowed charges are returned back from the massive members to the contact disc member.

Each massive member that comes to the horizontal plane of symmetry through the axis of rotation will lose its charge, $e_m=0$.

The massive members in the lower quadrants have an induced net negative charge, $-e_m$ burrowed again from the contact disc member, leaving the contact disc member induced with a positive charge:

$$[+e_D] \to [-e_{F1}\ldots +e_{F2}] \ldots [-e_m] \text{Lower Quadrants} \quad \text{equation (3)}$$

Summing equations (1), (2) and (3) leaves a net zero charge on the disc contact member. However, this flow of charges to and from the contact disc member is an alternating current of positive and negative charges flows and rotates with the contact disc member. This alternating current is superimposed at all points of the disc as a sinusoidal current varying in magnitude at each point with time as the disc rotates. It is clear that if this process continues, the contact disc member will build up heat. Thus, the power source will also experience a depletion as it does work on the contact disc member. When the power switch 140 is turned on, the process of rotation can continue until the power source is deplete. This is what powers the apparatus as a gravito-electrostatic motor.

It is another object of this invention to provide a means of rotary motion using a gravitational field, and an electrostatic field.

It is yet another objective of the present invention to provide for a rotary motor that uses the least energy for motion.

It is another objective of the invention to provide an apparatus that converts linear piezoelectric contraction and expansion to a rotary motion.

It is an object of the invention to provide for an apparatus that uses straight forward linear actuation and does not need specialized modes of oscillations of an electric power source acting on a piezoelectric crystal to achieve motion.

It is a further object of the invention to provide for massive members that slide radially on a disc member to achieve a rotary motion.

It is a further object of the invention to provide for an apparatus that can be scaled radially to provide for larger torques.

It is an objective of the present invention to create a motor that uses electrostatic and gravitational fields.

Figure 11:
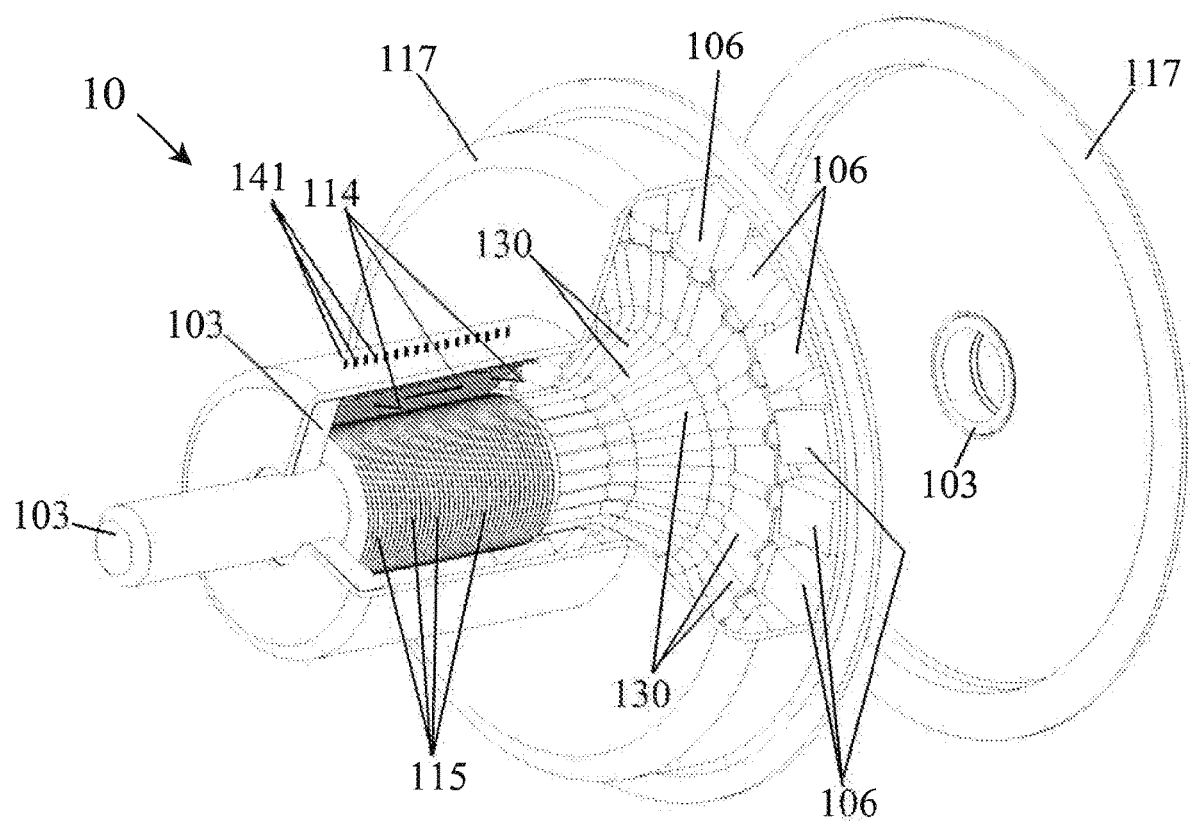

FIG. 11 shows a partial cut away of the housing according to the third embodiment of the invention. The disc contacts are shown held on the non-conducting disc member that is attached to the shaft member. Leaf springs are show contacting the disc contacts. The output contacts are shown connected to the leaf springs.

Figure 12:
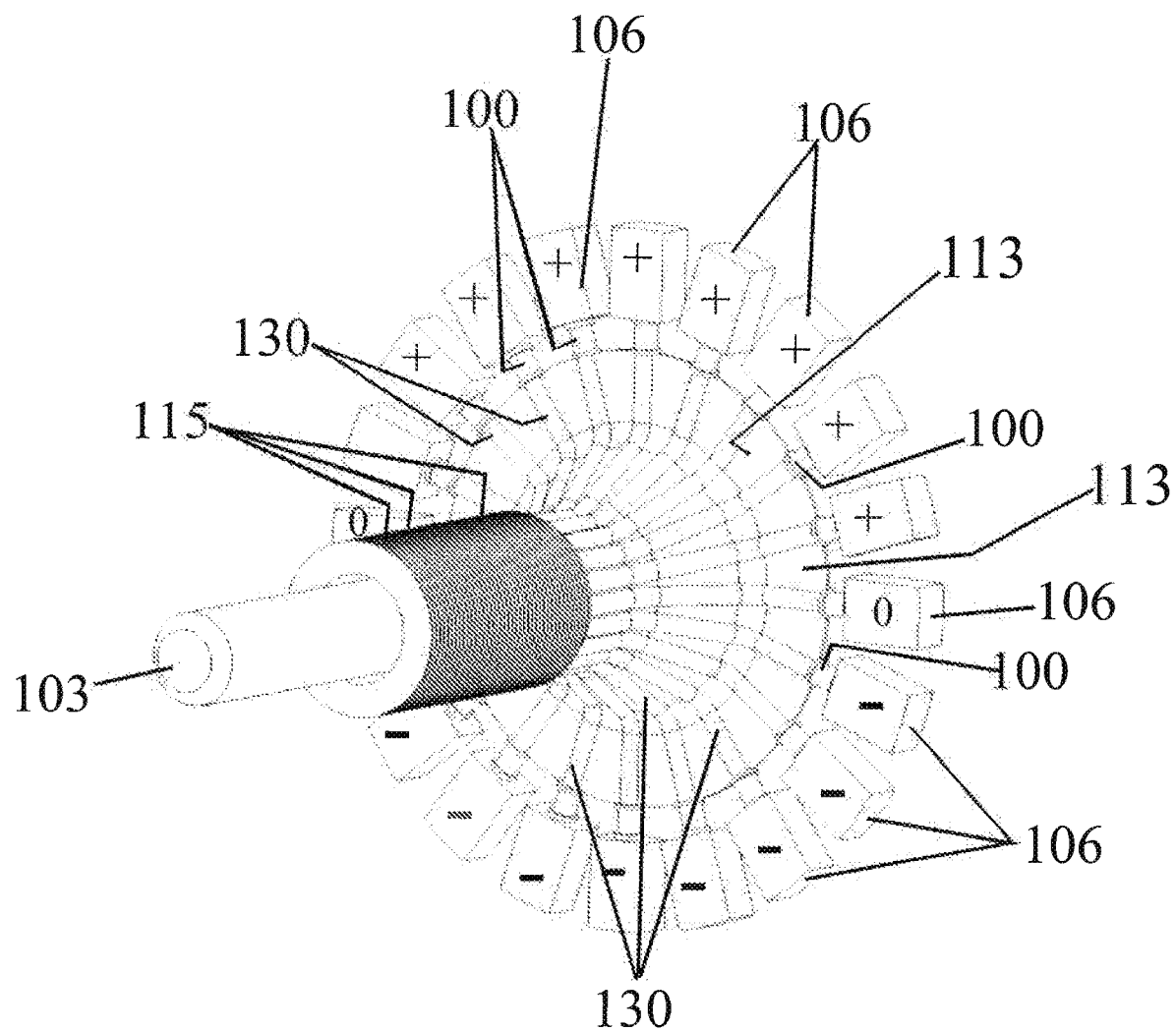

FIG. 12 shows a third embodiment with massive members and the charges generated as a result of gravitational stresses on the piezoelectric crystals. The ring contact members are shown held by the non-conduction disc member.

Figure 13:
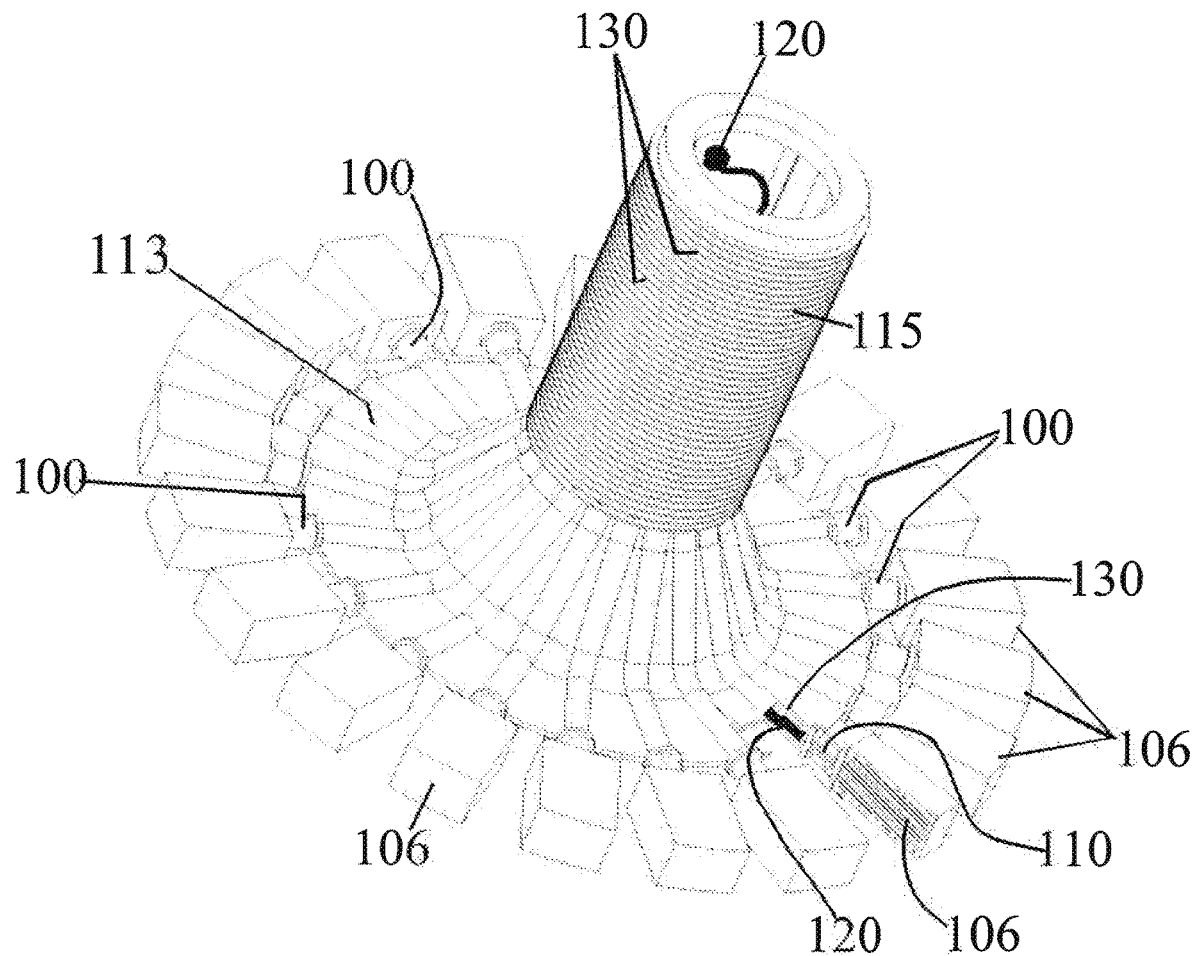

FIG. 13 shows the third embodiment with massive members and the piezoelectric crystals attached to the non-conducting disc member. A cut away view of the piezoelectric crystal body is shown connected to the massive member and the cable. The non-conducting disc member conduit for the cable is shown.

DETAILED DESCRIPTION OF THE INVENTION

An apparatus 10, using an applied voltage, $V_A$, and a gravitational field, G, on an arrangement of piezoelectric crystals 100, and massive members 106, both attached to a rotating contact disc member 112 that rotates with a shaft 103 in a housing is invented. The apparatus 10 can function as a motor, and as a generator of an electric current.

For the purposes of this invention, the following definitions apply.
1. Piezoelectric crystals shall mean any crystalline material with poled voltages that has the following properties;
   e. The piezoelectric crystal's dimension contracts in the direction of a poling voltage when applied voltage has polarity opposite to that of poling voltage. I shall denote this applied voltage as $\overline{V_A}$.
   f. The piezoelectric crystal's dimension extends in the direction of a poling voltage when the applied voltage has polarity similar to that of poling voltage. I shall denote this applied voltage as $V_A$.
   g. The piezoelectric crystal generates voltages with a polarity similar to poling voltage when compressive force is applied in poling direction. I shall denote this compression residual voltage as $V_C$.
   h. A tensile force applied to the poling direction generates a voltage with a polarity opposite to poling voltage in poling direction of the piezoelectric crystal. I shall denote this tensile residual voltage as $\overline{V_T}$ where, T, denotes tension.
2. Apparatus 10 is oriented with the right-side in a FIGURE, taken as the right side of the apparatus 10; the upper quadrants referring to the top two quadrants above the horizontal plane through the axis of rotation; the lower quadrants referring to the lower two quadrants below the horizontal plane through the axis of rotation.
3. Poling voltage, $V_P$, shall mean, the voltage difference that is inherently applied to bias and pole a piezoelectric crystal's dimension during manufacture, to generate an offset of its electronic structure, generating positively and negatively charged surfaces on the piezoelectric crystal.
4. Massive member, 106 shall mean any electrically conductive block of matter with a mass.
5. Applied voltage, $V_A$, shall mean electrical voltage, $+V_A$, $-V_A$, from a power source, applied between the positive and negative surfaces of a poled piezoelectric crystal. $\overline{V_A}$, shall mean the applied voltage has an opposite polarity to $V_A$.
6. Power source shall mean any electric power source that can apply an applied voltage, $V_A$.
7. Gravitational charges shall mean electric charges caused by stresses of a gravitational field on a massive member that generate a residual voltage on a poled piezoelectric crystal.

First Embodiment of the Invention

A gravito-electric motor comprising a rotatable shaft member centered on an axis, to rotate with a shaft member 103 in a balanced state; an electrically conductive contact disc member 112, attached to said shaft member 103, with a shaft member collar 102, locked unto the shaft member 103, to rotate with the shaft member 103, in a vertical plane perpendicular to the axis of rotation. The contact disc member 112 is in a dynamically and statically balanced state under the influence of gravity. The contact disc member 112, has a contact disc member boundary surface 128, with a multiplicity of contact disc member surface segments 129, plated with layers of metals to form contact disc member electrical contacts 128a. Each piezoelectric crystal 100 has a piezoelectric crystal first flat end face 108, and a piezoelectric crystal second flat end face 109 separated by a piezoelectric crystal body 110. Both the piezoelectric crystal first flat end face 108 and a piezoelectric crystal second flat end face 109 are plated with layers of metals to form a piezoelectric crystal first electrical contact 108a, and a piezoelectric crystal second electrical contact 109a, respectively. Each piezoelectric crystal first electrical contact 108a, is welded to a contact disc member electrical contacts 128a to form a radially symmetric array. Electrically conductive massive members 106, preferably in the form of one of, rectangular bodies, and cylindrical bodies, with each having at least one massive member surface 106a are provided. Each massive member surface 106a is plated with layers of metals to form a massive member electrical contact 105. Each massive member electrical contact 105, is welded to a piezoelectric crystal second electrical contact 109a such that, the apparatus 10 is in a state of dynamic and static balance under the influence of gravity with the shaft member 103, the contact disc member 112, the piezoelectric crystal 100 and the massive members 106.

An electrical power source 116, providing an applied voltage, $V_A$, with two opposite polarities is provided. One polarity, $+V_A$, is conductively applied using a brush contact 121 to selected massive members 106 that are exclusively on upper right quadrant 122, and lower right quadrant 124, of the apparatus 10. The opposite polarity, $-V_A$, is conductively applied to the contact disc member 112. Therefore, when the power source 116 is turned on, an electrical voltage difference is applied conductively between the piezoelectric crystal first electrical contact 108a, and a piezoelectric crystal second electrical contact 109a, and the piezoelectric crystal body 110 receives the applied voltage difference and extends. If the polarity of the applied voltage is reversed, the piezoelectric crystal body 110 contracts. Then, the extending and alternatively, contracting of the piezoelectric crystal 100, moves the massive members 106 radially to create an imbalance on the balanced gravitational moments acting on the shaft member 103. The imbalance will rotate the shaft member 103 with a moment of imbalance between the left quadrants and the right quadrants of the apparatus 10. Upon removal of said applied voltage, the piezoelectric crystal body 110 returns the massive member 106 to its original radial location to remove the imbalance again. The cycle repeats for every set of massive members 106 so moved to achieve either oscillatory motion, or continuous rotation of the shaft member 103.

FIGS. 1 to 9, show the apparatus 10, according to the first embodiment. A positive energy apparatus 10 is described in this invention that uses piezoelectric crystals 100 to create an asymmetry in the right-hand side gravitational moments, $M_R$, and the left-hand side gravitational moments, $M_L$ of massive members 106 to generate a rotary motion as a motor.

In its simplest form, the apparatus 10 consists of a highly conductive contact disc member 112 that is attached rigidly by means of shaft member collar 102 to a shaft member 103 that rotates freely on a pair of bearings 104, in a pair of housing members 117. The shaft member 103 rotates with the contact disc member 112. Preferably, the contact disc member 112, has a number of piezoelectric crystals 100, attached radially to form a radial symmetric array. An equal number of equal massive members 106 are attached to the other ends of the piezoelectric crystals 100, again to form a symmetric array about the rotation axis of the shaft member 103. Each of the massive members 106, and its diametrically opposite massive member 106, has the same weight for balance. Thus, each massive member 106 is held unto the contact disc member 112's circumference by a piezoelectric crystal 100. Each massive member 106 in the symmetric array has a diametrically opposite massive member 106 that can balance its weight to keep the contact disc member 112, and hence the shaft member 103, stationary.

Preferably, the contact disc member 112, and the massive members 106, are made from high density conductive metals such as, aluminum, copper, gold, and stainless steel. Preferably, each piezoelectric crystal 100, used by the apparatus 10, is a regular geometric shape, and preferably cylindrical in shape, and has a piezoelectric crystal body 110 that is preferably cylindrical, a piezoelectric crystal first flat end face 108, and a piezoelectric crystal second flat end face 109. Rectangular bodies can also be used to achieve the same purpose.

Preferably, the piezoelectric crystals 100 used by the apparatus 10, are all of the same dimensions, and all of the same electromechanical characteristics. Preferably the piezoelectric crystals 100, are all made from the same batch of suitable ceramic materials to maintain their uniformity.

Advantageously, the piezoelectric cylinder body 100 forms a gap 113 between a massive member 106, and the contact disc member 112. The piezoelectric crystal body 110 can be protected by a simple protective sleeve and also by a resilient silicone material that can expand and contract with its movement. Preferably, the piezoelectric body 110 is left open to the environment and protected by housing members 117, to allow adequate heat energy flow into, and from, the piezoelectric crystal body 110.

The piezoelectric crystal 100 is poled in the directions connecting piezoelectric crystal first flat end face 108 and the piezoelectric crystal second flat end face 109. The piezoelectric crystal 100 may also be any shape whatsoever, as long has it has a piezoelectric body 110, a piezoelectric crystal first flat end face 108 and an opposite facing piezoelectric crystal second flat end face 109.

Massive member electrical contact 105, and the contact disc member electrical contact 128a, and the piezoelectric crystal first electrical contact 108a, and the piezoelectric crystal second electrical contact 109a can be made from plating of a thick film of silver, sputtered with chrome, gold and nickel.

The contact disc member 112 is preferably a thin annular and metal disc with a cylindrical shaft member collar 102 centered on it, to allow the shaft member 103 connected mechanically. One face of the contact disc member 112 is used to sliding and conductively make contact with a conductive leaf spring 115 affixed to the stationary housing 117. The leaf spring 115 is connected to power leads 135a and 135b that transmit both one polarity of an applied voltage from an electrical power source 116, such as a battery.

Preferably each piezoelectric crystal 100 is welded mechanically to the contact disc member electrical contacts 128a, to form a symmetric array of radially placed piezoelectric crystals 100. Each piezoelectric crystal 100 is also welded conductively to a massive member 106 to form a matching symmetric array. A piezoelectric crystal body 110, of each piezoelectric crystal 100 forms a crystal gap 113 between the contact disc member 112 and each massive member 106.

The mechanical analog of the arrangement is that the piezoelectric crystals 100 act in a manner similar to small pistons that expand and contract in a radial direction to push and pull the massive members 106 toward and away from the center of rotation, respectively, as needed.

Advantageously, the contact disc member 112 acts as a common conductive contact for one polarity of an applied voltage on all the piezoelectric crystals 100. Therefore, the contact disc member 112 acts as one of the contact terminals 120 for every piezoelectric crystal 100 in the array, and the massive members 106 form the other contacts.

A brush contact 121 is provided. The brush contact 121 spans almost a half-ring of very fine flexible brushes that conduct electricity easily with minimal resistance. The brush contact 121 is a thin metal spring in the form of an arc that spans less than 180° in this embodiment. In a second embodiment it spans a little more than 180°. The contact brush 121 can also be made as fine bristles that make contact with the massive members 106. The brush contact 121 is attached to one of the housing members 117 as a stationary contact that is radially concentric to the contact disc member 112 to make contact with the massive members 106 on either two left quadrants, or two right quadrants of the apparatus 10. If a particular set of massive members 106 is required to be activated, then independent brush 121 members can be used to apply a current to said set.

For purposes of explanations of the invention, the brush contact 121 can be placed to contact massive member 106 only on the two right quadrants of the apparatus 10, for example, but can also be placed in arbitrary places as segmented parts for example. Taking the convention that the apparatus 10, as oriented above, will rotate in a clockwise direction, then the brush contact 121 will be concentric to the two right-hand quadrants, RH of the assembled apparatus 10, and making contact with only massive members 106 exclusively on the right-hand quadrants of the apparatus 10. The brush contact 121 and the contact disc member 112, form two electric sliding contact terminals 120 for a power source 116 that can supply an actuation applied voltage of polarity, $V_A$, to massive members 106 they contact on the right quadrants.

The piezoelectric crystal 100's dimension expands in the direction of a poling voltage. The applied voltage, $V_A$, is taken to have a polarity similar to that of poling voltage, $V_P$. Thus, when applied, piezoelectric crystal 100's dimension expands in the direction and the massive members 106 exclusively on the right quadrants, are pushed further away from the center of rotation of the shaft member 103 to create an imbalance in the gravitational moments, of the left quadrants, $M_L$ and the right quadrants, $M_R$ respectively, to cause rotation. A reversal of polarity reverses the rotation.

The brush contact 121, and the leaf spring 115 contact, are attached to their specified locations to slidingly and selectively contact massive members 106 that come in contact in only the right quadrants of the motion for example. The leaf spring 115 contact, and the brush contact 121, are preferably rivetted unto the housing to extend therefrom and slidingly and conductively contact the contact disc member 112, and the selected massive members 106 exclusively and respectively, on the right quadrants. This supplies electrical power to the contact disc member 112 and to selected massive members 106 on the right quadrants only, transmits the applied voltages to the piezoelectric crystals 100 they are welded to.

Figure 1:
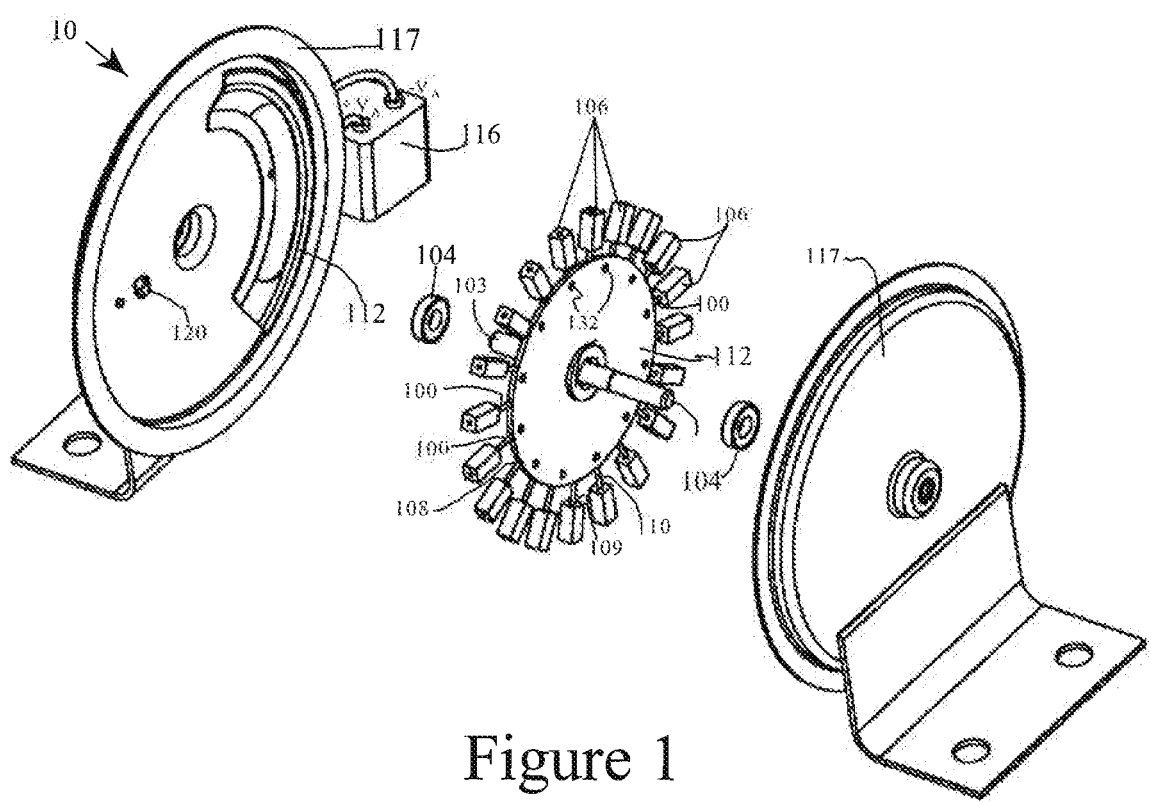
FIG. 1 shows an exploded view of the apparatus.
Figure 2:
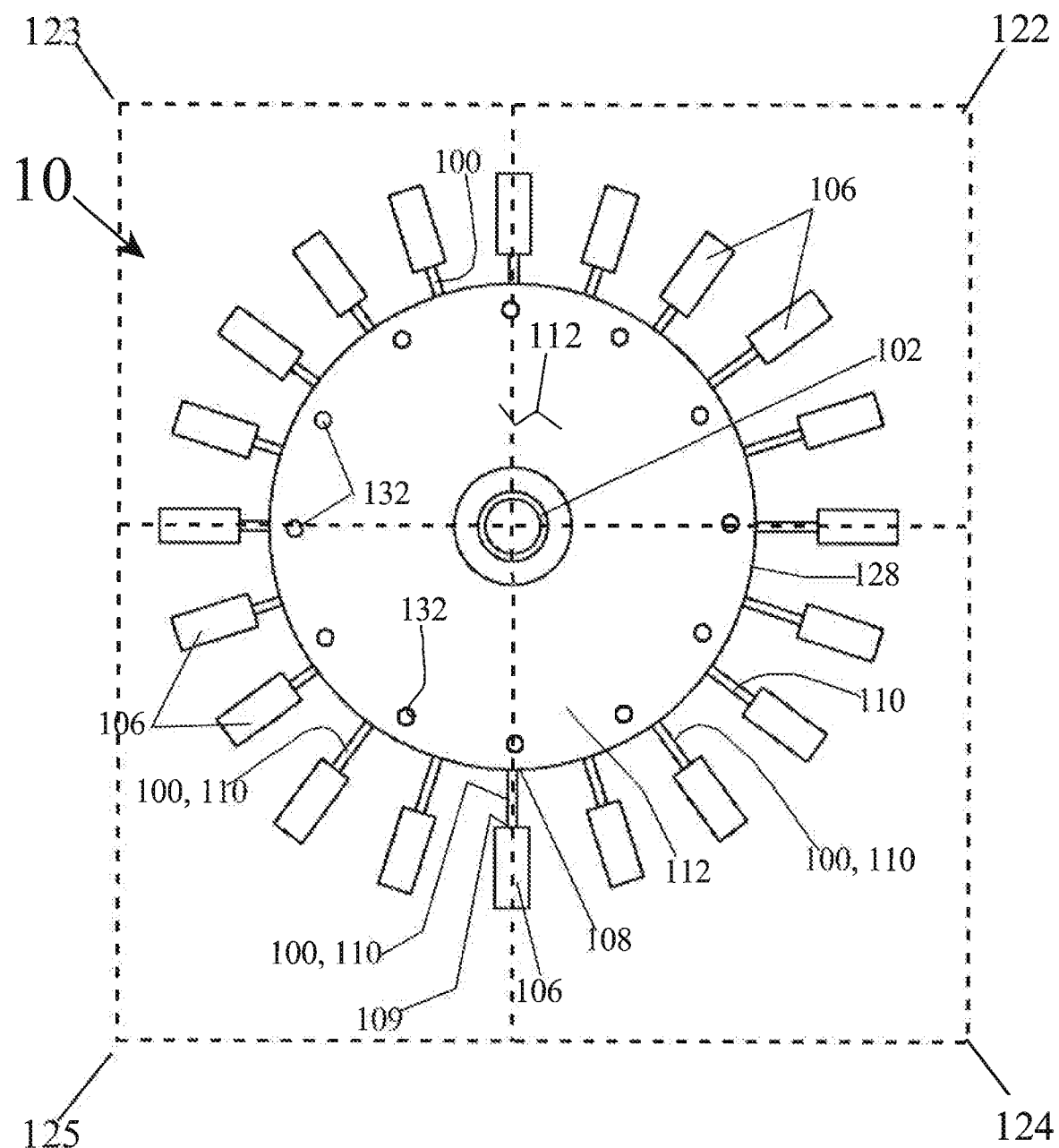
FIG. 2 shows the quadrants of the contact disc member used for various purposes by the invention.
Figure 3:
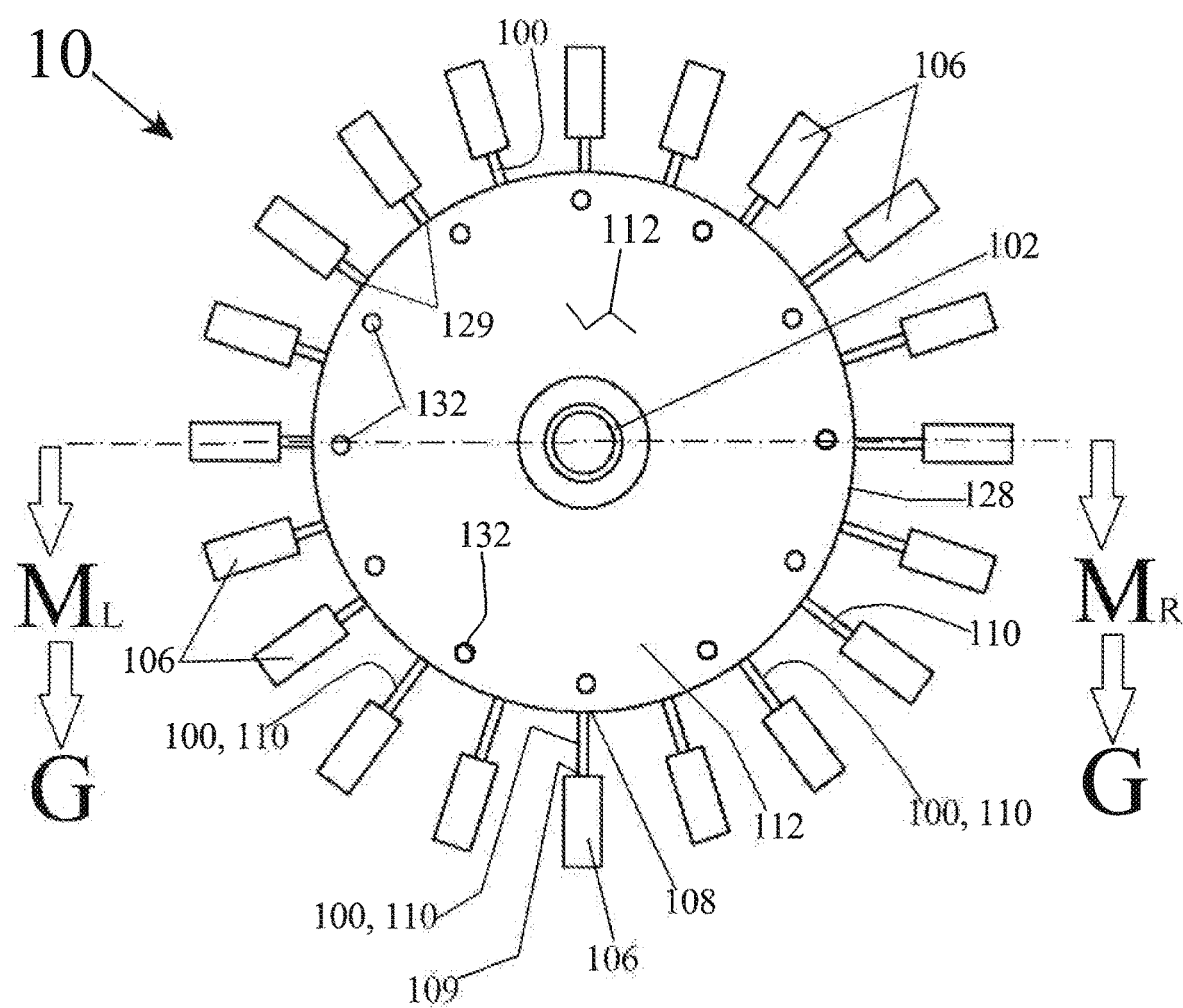
FIG. 3 shows a gravitational moment difference between the right of the axis and the left of the axis caused by the gravitational field acting on an imbalance of the moments to create a rotation of the shaft member of the apparatus.
Figure 4:
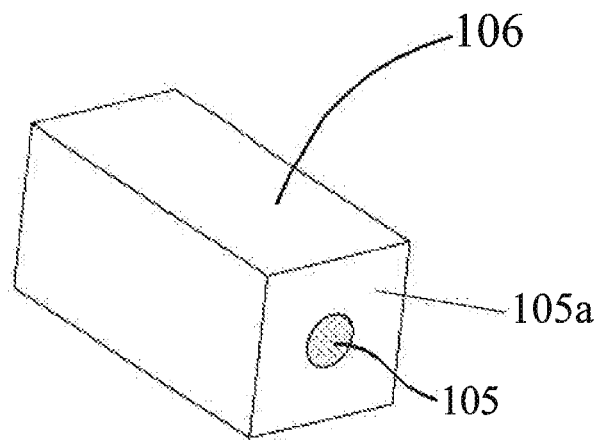
FIG. 4 shows a typical example of a massive member with a massive members electrical contact area for welding it to a piezoelectric crystal.
Figure 5:
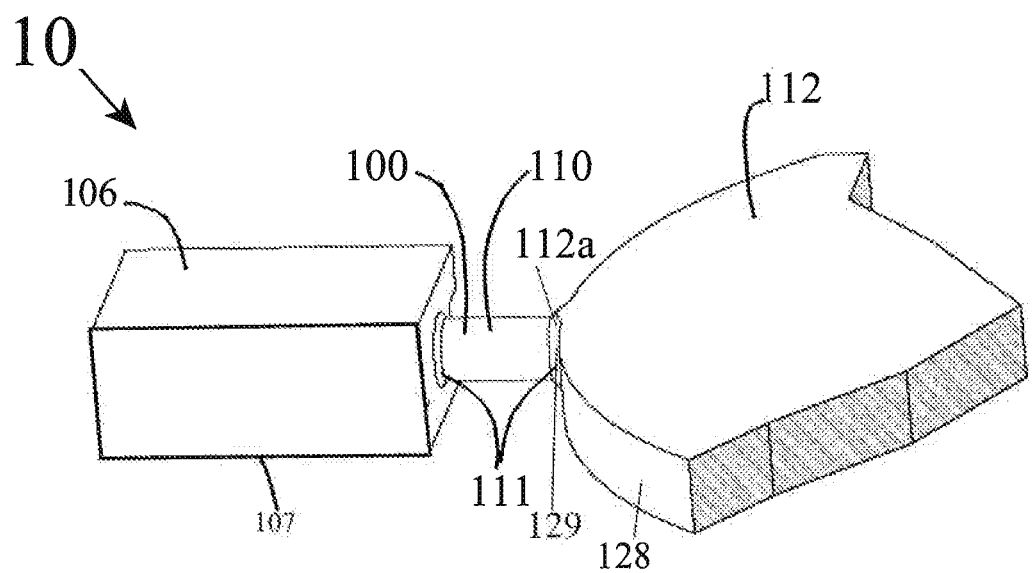
FIG. 5 shows a typical example of a massive member welded to a piezoelectric crystal second end face and welded to the rim of the contact disc member.
Figure 6:
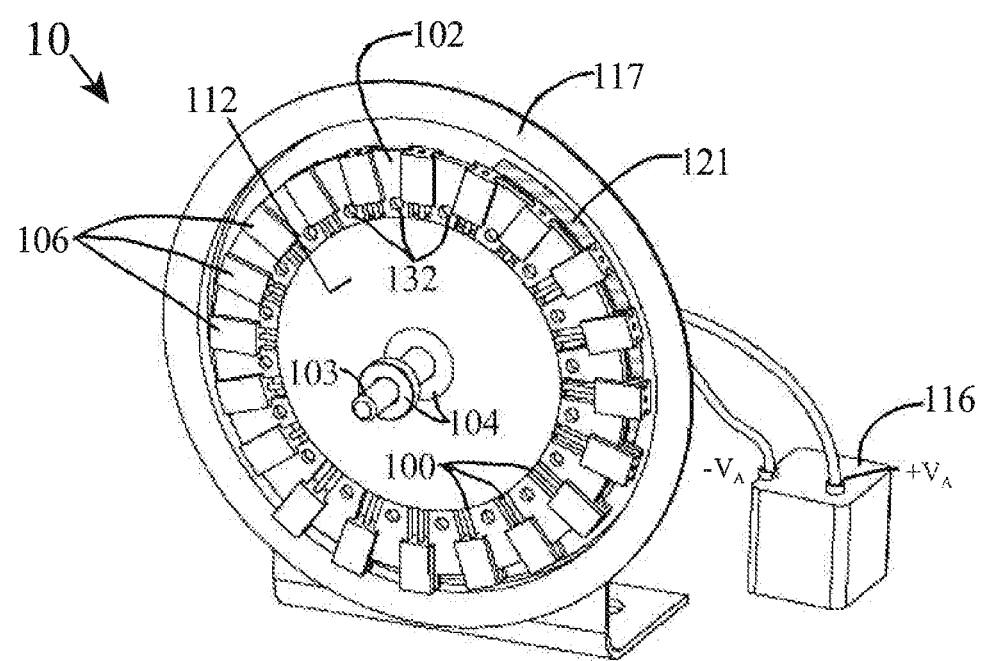
FIG. 6 shows the apparatus with one of the housing members removed to show the interior assembly.
Figure 7:
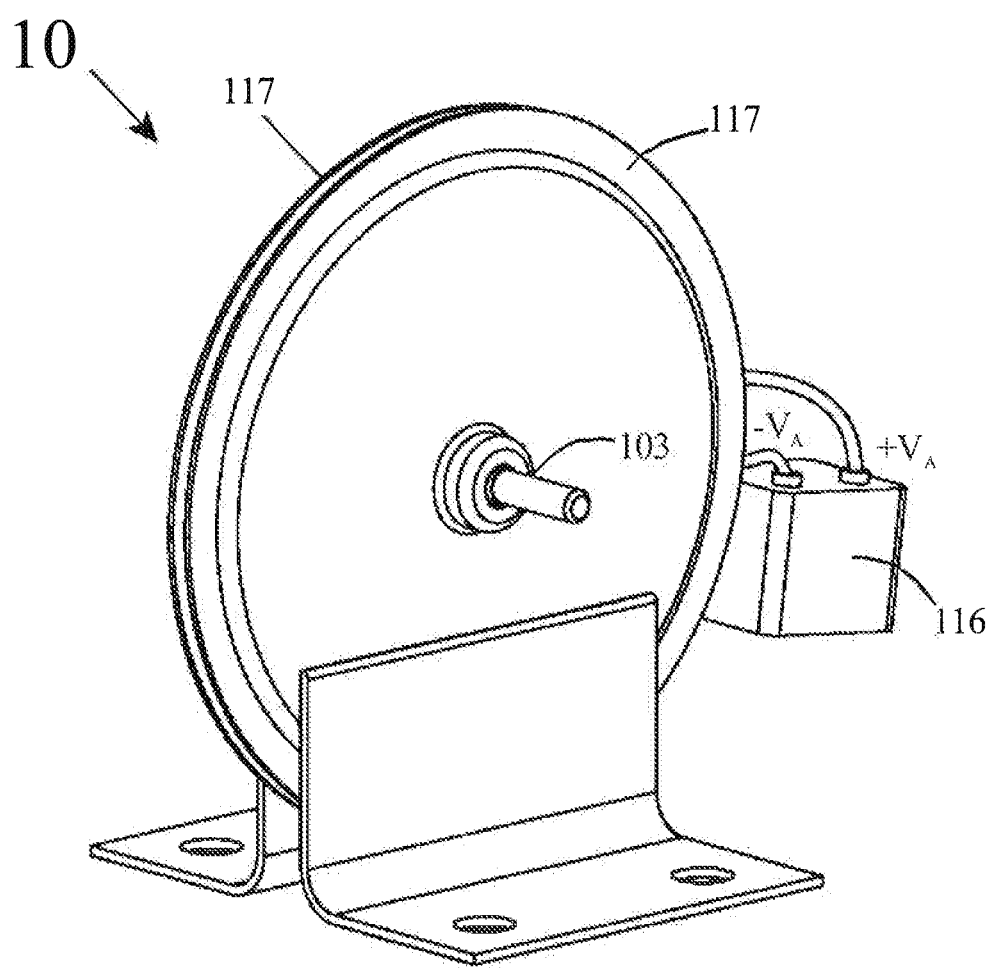
FIG. 7 shows an example of what the apparatus may look like fully assembled.
Figure 8:
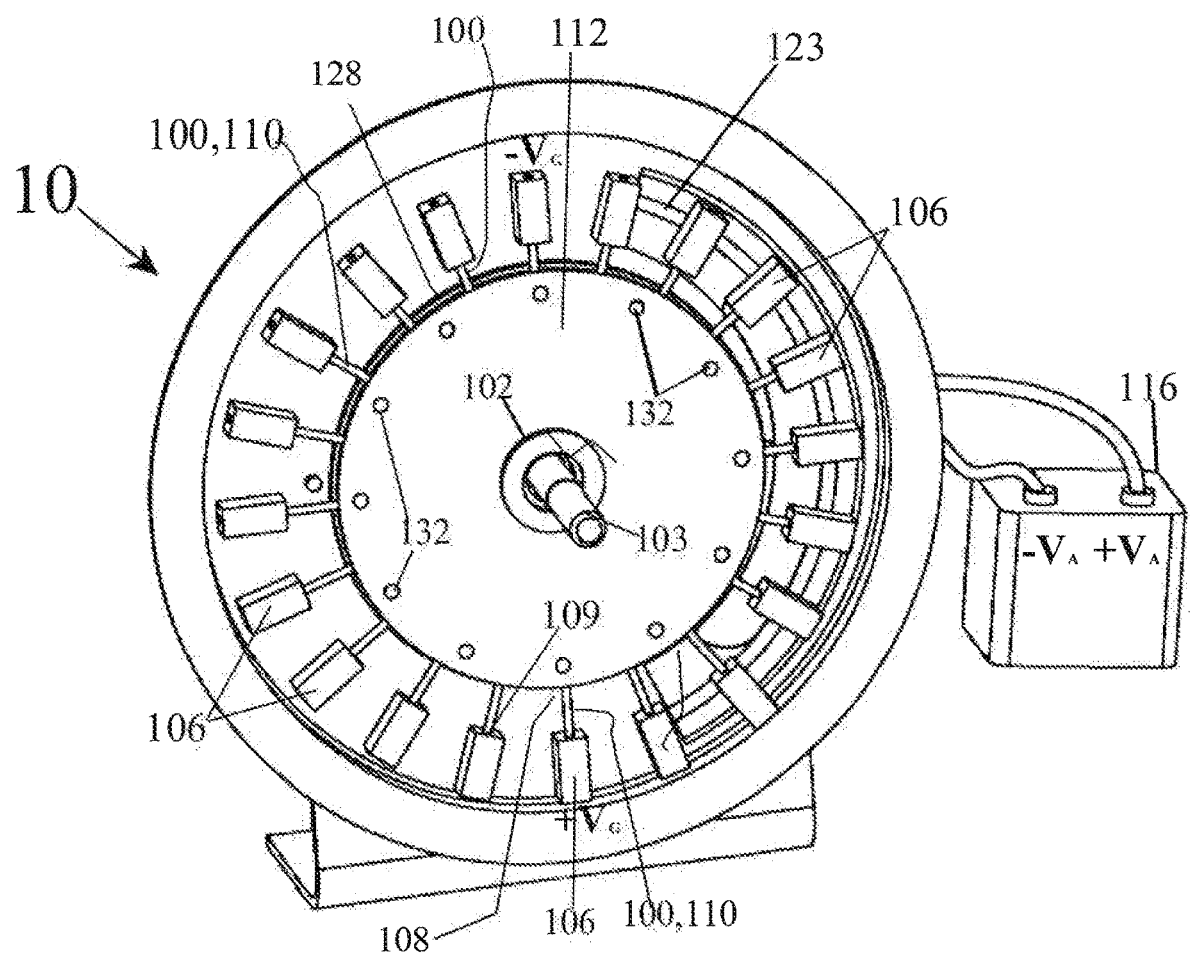
FIG. 8 shows a brush contact bridging all the massive members to the right to extend or contract their piezoelectric crystals simultaneously.
Figure 9:
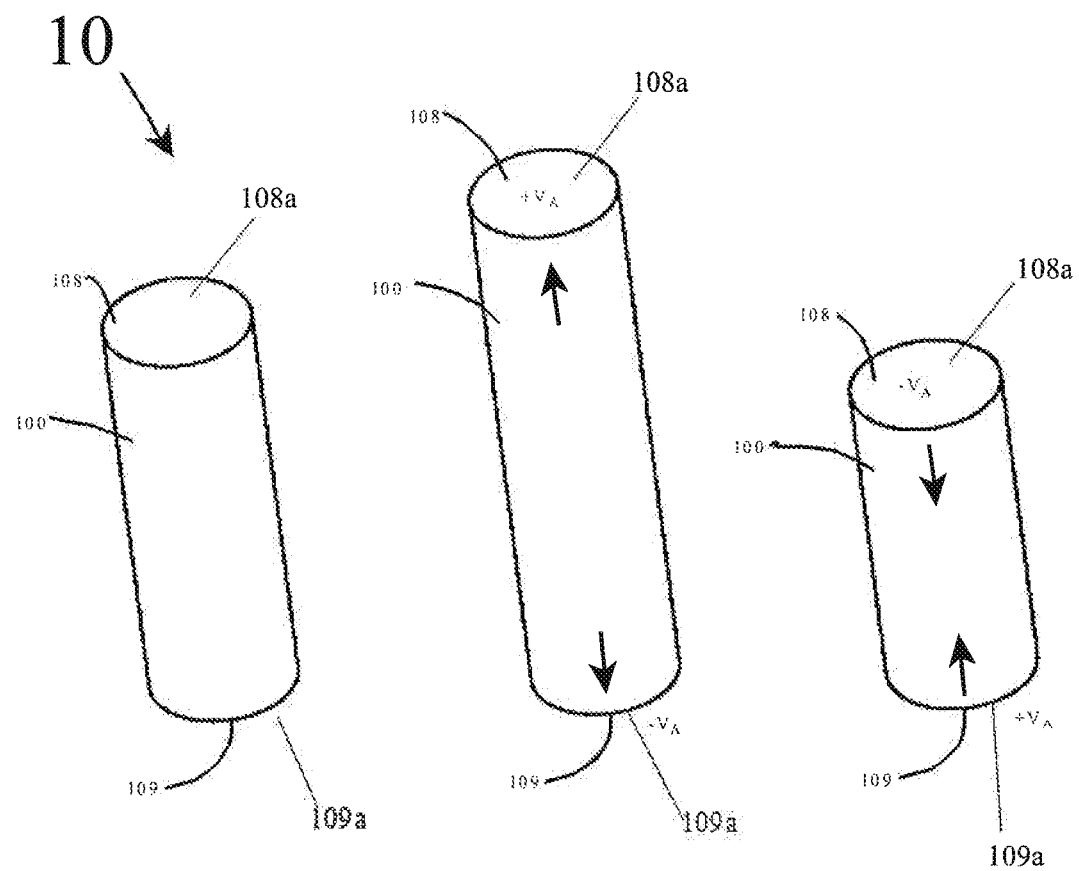
FIG. 9 shows a typical diagram of a piezoelectric crystal that is poled to contract when the current applied to it has a similar pole to the poled crystal, and when it is in a relaxed state, and then contracted by an opposite polarity. The piezoelectric crystal's dimension contracts in the direction of a poling voltage when applied voltage has polarity opposite to that of poling voltage.
Figure 10:
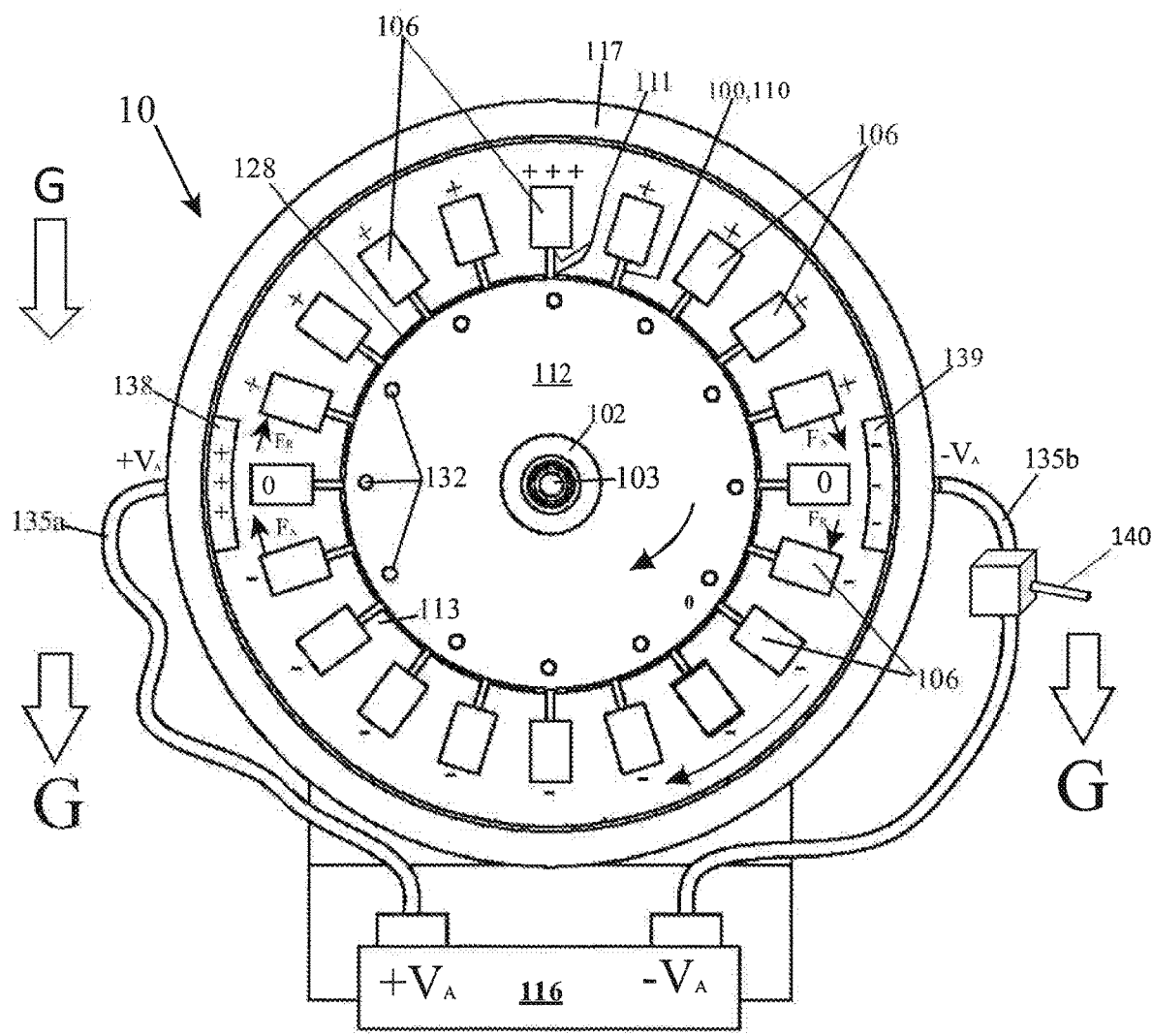
FIG. 10 shows the configuration of the apparatus according to the second embodiment when it acts as a gravito-electrostatic motor. The gravitationally induced charges are shown on the massive members as positive when the crystals are compressed by the weights of the massive members, and negative when the crystals are extended by the weight of the massive members.

Advantageously, the expansion and contraction of each piezoelectric crystal 100 can slidingly move the massive member 106 in a radial direction, reducing or selectively, increasing their radial locations. A power switch 140 is also provided to turn on the power source using one leg of the negative terminal as shown in FIG. 10.

A positional encoder that measures the rotation angles is provided, to rotate with the shaft member 103 and measure the exact position of the rotational disc relative to some reference home position. Preferably, the encoder can be formed from the members of the apparatus 10 without adding cost. The encoder can be designed as part of the contact disc member 112 by laser drilling the contact disc member 112 with many equally spaced, and radially equal encoding holes 132, in a circumferential array. These encoding holes 132 can be used to pass a narrow light beam such as a diode laser beam to a light-sensitive detectors through the disc contact member to generate signals that can be used to trigger events during operation of the apparatus 10. The pulses generated by a light sensitive detector as the encoding holes 132 pass the light beam to impinge on a detector, and the signals generated by the detector can be used to measure position, speed, and do other functions in a circuit.

Advantageously, an applied voltage, $V_A$ to the contact disc member 112 and a massive member 106, will be transmitted to piezoelectric crystal first flat end face 108, through the piezoelectric crystals 100 body and to the piezoelectric crystal second flat end face 109, to extend the piezoelectric crystals 100 on the right quadrants as needed. This applied voltage, $V_A$, will cause the piezoelectric crystals 100 to push the massive members 106 that come into contact with the brush contact 121 in a radial direction, away from the central rotational axis of symmetry. As such the location of massive members 106 can be selectively extended on the right quadrants, to break the symmetry of their gravitational moments (radius multiplied by weight) about the axis of the rotation of the shaft member 103, and cause the shaft member 103 to rotate clockwise. The converse voltage $\overline{V_A}$, will cause the rotations to reverse also.

To understand the advantage of the apparatus 10, one simply needs to scale the radial location of the massive members 106, to realize that the same energy imparted on a piezoelectric crystal 100 to move the massive member 106, will generate a larger gravitational moment on the scaled apparatus 10 with reduced torque. The torque only depends on the massive member 106 masses, and their radial location.

The apparatus 10 can also be configured with one and many leaf spring 120, to make contact with one and multiple massive members 106 at the same time.

Let the apparatus 10 be oriented such that axis of rotation of the contact disc member 112 is perpendicular (horizontal) to the gravitational field, G, (vertical). Define four (4) quadrants for the massive members 106' location on the contact disc member 112: An Upper left quadrant 123, an Upper right quadrant 122, a Lower right quadrant 124 and a Lower left quadrant 125. As each massive member 106 rotates, it generates gravitational compressive stresses, C, and gravitational tensile stresses, T, caused by the weight of each massive member 106 acting on the piezoelectric cylinder body 110, to generate measurable residual gravitationally induced voltage. The compressive stresses only occur at the upper quadrants (top half) of the apparatus 10, while tensile stresses only occur at the lower quadrants (bottom half) of the apparatus 10. The piezoelectric crystal body 110 will generate induced gravitational tension voltages $\overline{V_T}$, on the piezoelectric crystal body 110 in the two lower quadrants, and also induced an equal but opposite gravitational compression voltages, $V_C$, on the piezoelectric crystal body 110 in the two upper quadrants.

Advantageously, the gravitational field stresses act like a battery in the apparatus 10 with a positive and negative charge induced on diametrically opposed piezoelectric crystal body 110 and thus imposed on massive members 106. In general practice, the gravitational voltages, (will be referenced indiscriminately as $V_G$), are used in the calibration and manufacture piezoelectric-based scales and piezoelectric-based accelerometers.

When the massive members 106 on the right quadrants are actuated and displaced with an applied voltage, $V_A$, the piezoelectric crystal 100 bodies extend, while the piezoelectric crystal 100 bodies on the left quadrants are un-activated and at a relative relaxed state.

Therefore, an applied voltage, $V_A$ applied between the contact disc member 112 and the brush contact 121, can cause the massive members 106 attached to piezoelectric crystal body 110 to slightly move (a few micrometers), away from its position of radial symmetry in relation to a diametrically opposite massive member 106. This causes a difference between the left gravitational moments, $M_L$, and the right gravitational moments, $M_R$. This difference in moments exert a gravitational moment, M, on the shaft member 103 of the apparatus 10 and causes the shaft member 103 to rotate in a clockwise direction of rotation. Since, the massive members 106 in the left quadrants of the apparatus 10 are in an electrically relaxed state, the right gravitational moments, $M_R$ must be greater that left gravitational moment, $M_L$ and so advantageously a difference in moments will always be manifest to keep the apparatus 10 rotating in a clockwise direction. The imbalance in gravitational moments, is caused by the massive members 106 on the right quadrant being extended to a greater radial position than the radial positions of the massive members 106 on the left quadrants. This breaks the symmetry of the apparatus 10, and the shaft member 103 will rotate accordingly.

Regardless of how many massive members 106 are actuated by an applied voltage, the apparatus 10 will always try to restore the symmetry of the net gravitational moment of all the massive members 106, by rotations and by rotational oscillations.

One object of the invention is to provide an apparatus 10 with a symmetric array of piezoelectric crystals 100, and a symmetric array of massive elements, such that a current applied to a subset of said piezoelectric elements breaks the symmetry of the gravitational potential of said symmetric array of massive elements, to cause rotation. The apparatus will work in orientations of the plane of rotation other than a horizontal plane.

Second Embodiment of the Invention

FIG. 10 shows the second embodiment of the invention.

The second embodiment of the invention uses gravitationally induced voltages, $\pm V_A$, on massive members 106 to interact with electric fields to cause motions.

A motor comprising a rotatable shaft member centered on an axis to rotate in a balanced state; an electrically conductive contact disc member 112 attached to said shaft member 103 with a shaft member collar 102 is locked unto the shaft member 103 to rotate with the shaft member 103 in a vertical plane perpendicular to the axis of rotation. The contact disc member 112 is in a dynamically and statically balanced state under the influence of gravity. The contact disc member 112 has a contact disc member boundary surface 128 with a multiplicity of contact disc member surface segments 129 plated with layers of metals to form contact disc member electrical contacts 128a. Each piezoelectric crystal has a piezoelectric crystal first flat end face 108 and a piezoelectric crystal second flat end face 109. Both the piezoelectric crystal first flat end face 108 and a piezoelectric crystal second flat end face 109 are plated with layers of metals to form a piezoelectric crystal first electrical contact 108a, and a piezoelectric crystal second electrical contact 109a. Each piezoelectric crystal first electrical contact 108a is welded to contact disc member electrical contacts 128a. An electrically conductive massive member 106, preferably in the form of one of, a rectangle body and a cylinder, with least one massive member surface 106a is provided. The massive member surface 106a is plated with layers of metals to form a massive member electrical contact 105. The massive member electrical contact 105 is welded to the piezoelectric crystal second electrical contact 109a such that the massive member 106 is in a state of dynamic and static balance under the influence of gravity with the shaft member 103, and the contact disc member 112, the piezoelectric crystal. An electrical power source 116 providing a voltage source with two opposite polarities $V_A$, $-V_A$, is provided.

A positive plate 138 for capacitively holding a positive charge is provided. A negative plate 139 for capacitively holding a negative charge is provided. The positive plate 138 is positioned on a horizontal plane passing through the axis of rotation of the shaft member 103, and at radial location in the proximity of the orbit of the massive members 106. The negative plate 139 is also positioned on a horizontal plane passing through the axis of rotation of the shaft member 103, and at radial location diametrically opposite to the radial location of said positive plate 138. The positive plate 138 is connected to a positive pole of the power source 116, and the negative plate is connected to the negative pole of the power source 116.

When a massive member 106 is in a location above said horizontal plane through the axis of rotation, its compressive gravitational weight compresses the piezoelectric crystal body 110 and induces a gravitational voltage, $-V_G$ on the piezoelectric crystal first end faces 108, and hence on the contact disc member 112, and also induces a voltage, $+V_G$ on the piezoelectric crystal second end faces 109, and hence on the massive members 106.

When a massive member 106 is in a location below said horizontal plane of symmetry, its tensile gravitational weight tensile stresses acting on the piezoelectric crystal body 110 it is attached to induces a gravitational voltage, $+V_G$ on the piezoelectric crystal first end faces 108, and hence on the contact disc member 112, and also induces a voltage, $-V_G$ on the piezoelectric crystal second end faces 109, and hence on the massive members 106. The gravitational voltages, $+V_G$, and $-V_G$, appear on the massive members 106 above the horizontal plane of symmetry and below the horizontal plane of symmetry, respectively.

It must be noted that angular speed, w, will contribute centrifugal force tensile stresses, voltages, $-V_T$, on all the piezoelectric crystals 100. This stress depends on the imbalance and is limited to a maximum rate at which the massive members 106 that are off-balance fall or rise under the gravitational field, G's influence. As such the angular speed, w, and the apparatus 10 affects the values of the induced gravitational voltages, $V_G$ and the apparatus 10 is limited to some maximum angular speed, ω. Thus, variation of $V_G$ will not be a true sinusoidal-time-function. For purposes of this invention, it suffices to describe them as sinusoidal approximations when the apparatus 10 achieves a uniform angular speed, ω.

In all cases, n sinusoidal gravitational voltages, $-V_T \pm V_G$, will be present in n piezoelectric crystals 100 caused by the gravitational field compression and tension, and centrifugal tensile forces acting on n-massive members 106, with a phase difference Ø between massive members 106, given in radians, by the relation, $$\phi = \frac{2\pi}{n}$$

This phases difference of due to the gravitational voltages, $\pm V_G$, is an alternating voltage that is imposed on each of the massive members 106. The gravitational voltages, $\pm V_G$, can be used to perform actions on selected piezoelectric crystals 100 to enhance the power of the apparatus 10. The effect of this arrangement will result in advantages of the invention as will described later. Advantageously, the gravitational field stresses act like a battery in the apparatus 10 with a positive and negative charge induced on diametrically opposed piezoelectric crystal body 110 and thus imposed on massive members 106.

If the angular position θ, at a time t=0, from start of motion of a given massive member 106, is given by θ=ωt, where, ω, is the angular speed of rotation. θ=0, at the topmost position, the net gravitational voltage, $+V_G$, generated on the actuated massive member 106, and thus to its piezoelectric crystals 100 will be given by the cumulative effect of all the massive members 106:

$$V = -V_T + V_G \sum_{k=1}^{n-1} \sin\left(\omega t + \frac{2\pi}{k}\right)$$

If V is negative, then all the massive members 106 of the apparatus 10, will have a net negative charge and this embodiment will still work, but the rotational rate and torque generated will be impaired. As such the apparatus is self-limiting to rotations for which the values of V are positive when in the upper two quadrants, $$+V_G \sum_{k=1}^{n-1} \sin\left(\omega t + \frac{2\pi}{k}\right) - V_T > 0$$

and in the lower two quadrants $$+V_G \sum_{k=1}^{n-1} \sin\left(\omega t + \frac{2\pi}{k}\right) - V_T < 0$$

The energy relation that makes that possible is given by the mass, m, of a massive member 106, the velocity, v, of the massive member, and the radius of the r, of the center of mass of a massive member 106. Let the radius of the location of a massive member relative to the Earth's center be R, M, the mass of the Earth, G, the gravitational constant. Then for a mass to achieve free fall at any location of its rotation, where no the centrifugal stresses can overcome the gravitational stresses, the forces must balance:

$$\frac{mv^2}{r} = \frac{GMm}{R^2}$$

Here, $G=6.67\times10^{-11}$ Nm² kg⁻², is the gravitational constant and R=6400 km, is the approximate radius of the Earth at its surface, Thus, for a rotational disc that places the center of mass of the massive members at rest at a radius=r, meters the velocity, v, of motion required for free fall at the crest is given by:

$$v = \frac{6.67x10^{-11}x5.976x10^{24}}{(6400\times10^3)^2}\sqrt{r} = 3.1195\sqrt{r}\ ms^{-1}$$

Assuming the massive member 106 is initially at rest at the crest and biased in one direction, the motion of the massive member due to the offset imparted by a piezoelectric crystal 100 is given by the gravitational relation for the gravitational acceleration, g=9.81 ms⁻² for the time t, of free fall:

$$2r = \frac{1}{2}gt^2$$

And the time in seconds taken to reach the horizontal plane where it has the highest tangential velocity is given by:

$$t = \sqrt{\frac{2r}{g}} = \sqrt{\frac{2r}{9.81}} = 0.144\sqrt{r}\ \text{seconds.}$$

At the horizontal plane where it has the highest tangential velocity is given by:

$$u=0.144\times9.81=1.414\sqrt{r}\ \text{meters per}$$

Thus, $$v=3.1195\sqrt{r}>u=1.414\sqrt{r}\ \text{meters per}$$

The gravitational stresses will always be greater than the centrifugal stresses, and thus the upper quadrants will always have a dominant positive gravitational residual charge:

$$V = V_G \sum_{k=1}^{n-1} \sin\left(\omega t + \frac{2\pi}{k}\right) - V_T > 0$$

The massive members above the below the horizontal plane of symmetry will always have a dominant negative gravitational residual charge:

$$V = V_G \sum_{k=1}^{n-1} \sin\left(\omega t + \frac{2\pi}{k}\right) - V_T < 0$$

This difference in residual charges is what is used to drive the apparatus 10.

It is clear that these gravitational residual voltages already perform great function in their use for scales and accelerometers. They can also do functions for the apparatus 10, such as creating a resonant circuit that will oscillate sinusoidally to resonate with the applied voltage and generate more power by tuning the frequencies of rotation. Note that the static potential energy that these voltages create are significant, and in fact are proportional to the weights and accelerations they measure. It is this energy that is stored as potential in a poled crystal.

Note that electronic lighters use the compressive forces on crystals to generate a current that sparks a lot of energy to burn a fuel.

An electrical voltage source 140, is provided with a positive and negative voltage polarities respectively, and the positive polarity is conductively connected with a power lead 135a to the positive plates 138 positioned on the left quadrants symmetrically on horizontal plane of symmetry through the axis of rotation of the apparatus 10. The negative polarity of the power source 116 is also conductively connected with a power lead 135b to the negative plate positioned on the right quadrants symmetrically on horizontal plane of symmetry through the axis of rotation of the apparatus 10.

It is important that the angular span of both the positive plate 138 and the negative plate 139 be approximately equal to the angular span of a massive member 106 when it is symmetrically positioned on the horizontal plane of symmetry through the axis of rotation of the apparatus 10.

Since the massive members 106 have minimal tensile charges when they are symmetrical on horizontal plane of symmetry through the axis of rotation of the apparatus 10, both the positive plate 138 and the negative plate 139 will not be affected significantly by their rotational passage through horizontal plane of symmetry through the axis of rotation of the apparatus 10.

The massive members above the horizontal plane of symmetry are therefore charged positively. And the massive members to the massive members 106 below the horizontal plane of symmetry are therefore charged negatively.

As soon as the massive members 106 on the right upper quadrant 122 pass below the horizontal plane of symmetry to the lower right quadrant 124, they become charged with gravitationally induced charges that are negative. As soon as the massive members 106 on the lower left quadrant 125, pass above the horizontal plane of symmetry to the upper left quadrant 123, they become charged with gravitationally induced charges that are positive.

As such when the power source 116 is turned on, a positive electrical field is generated on the positive plate 138, and a negative electrical field is generated on the negative plate 139.

The positive plate 138 in the left quadrants will attract negatively charge massive members 106 in the lower left quadrant 125 that are rising to the horizontal plane of symmetry, while repelling the massive members 106 that are in the upper left quadrant 123, above the horizontal plane of symmetry with a positive charge.

Similarly, the negative plate 139 will attract the massive members 106 that are falling to the horizontal plane of symmetry in the upper right quadrant 122 with a positive charge, while repelling the massive members 106 in the lower right quadrant 124 with a negative charge.

The attraction and repulsion of the massive members 106 will cause them to rotate and thereby generating a torque on said shaft member.

FIG. 10 shows the apparatus 10 according to the second embodiment. An apparatus 10, is invented to generate motion as a motor, using the electric field, the gravitational field, piezoelectric crystals 100, and massive members 106. The second embodiment of the invention has exactly the same elements as the first embodiment, except that the brush contact 121 is not needed. As shown in FIG. 10, a positive plate 138 and a negative plate 139 are provided and connected to a power source 116 such as a battery. Cable 135a connects to the power terminal, $V_A$ of power source 116, and then passes sealingly through housing member 117 to connect to the Positive plate 138 and impart a positive charge on it. Cable 135b connect to the power terminal, $-V_A$ of power source 116 and then passes sealingly through housing member 117 to connect to the Negative plate 139 and impart a negative charge on it.

Positive plate 138 and Negative plate 139 are designed to seat inside housing member 117 concentric to the orbit of the massive members 106. Both plates are provided with a small clearance gap to separate them from the massive members 106 during their rotational orbits. The positive plate 138 and the negative plate 139 are diametrically opposite and both are centered circumferentially on the horizontal plane of symmetry through the axis of rotation as shown in FIG. 10. A power switch 140 is also provided to turn on the power source using one leg of the negative terminal as shown in FIG. 10.

As shown in FIG. 10, the apparatus 10 has massive members 106 that are configured as described earlier. In this case no applied voltage $V_A$, is applied to any of the massive members 106. As before, the contact disc member 112 is connected to all the piezoelectric crystal first end faces 108, and the massive members 106 are again connected to the piezoelectric crystal second end faces 109. The positive terminal $+V_A$, from the power source 116, is used to generate a positive charge field on a positive plate 138. The negative terminal $-V_A$, from the power source 116, is used to generate a negative charge field on a negative plate 138. Both the positive plate 138 and the negative plate 139 are radially adjacent to the orbit of the massive member 106 with a small gap separating them from the massive members 106 to allow the massive members 106 to freely orbit without hindrance.

The positive plate 138 is placed in the housing member 117 at the junction between the upper left quadrant 123, and the lower left quadrant 125, to be shared by both quadrants, while the negative plate 139 is placed at the junction between the upper right quadrant 122, and the lower right quadrant 124, to be shared by both. With this arrangement, the following is true.

(a) The piezoelectric crystal 100 generates voltages with a polarity similar to poling voltage when compressive force is applied in poling direction. I shall denote this residual compression voltage as $V_G$. Therefore, gravitational compressive forces G, acting on each massive member 106 in the two upper quadrants will generate positive residual charges.

(b) A tensile force applied to the poling direction generates a voltage with a polarity opposite to poling voltage in poling direction of the piezoelectric crystal 100. I shall denote this tensile residual voltage as $-V_G$, where, G, denotes gravitational field. Therefore, gravitational tensile forces, acting on each massive member 106 in the two lower quadrants will generate negative residual charges, –e.

(c) All the residual charges, +e. generated on all the massive members 106 on the upper left quadrant 123 and the upper right quadrant will be for all practical purposes, (baring the miniscule and incalculable difference in the gravitational field between the upper quadrants) will be the same and of the same electric polarity.

(d) All the residual charges, –e generated on all the massive members 106 on the lower right quadrant 124 and on the lower right quadrant 125 will be for all practical purposes, (baring the miniscule and incalculable difference in the gravitational field between the upper quadrants) will be the same and of the same electric polarity.

(e) Applying a positive charge field, +e, on the positive plate 138 will repel all the massive members 106 with a positive charge field, +e, on the upper left quadrant 123 and the upper right quadrant.

(f) Applying a positive charge field, +e, on the positive plate 138 will attract all the massive members 106 with a negative charge field, –e, on the lower left quadrant 125 and the lower right quadrant 124.

(g) Applying a negative charge field, –e, on the negative plate 139 will attract all the massive members 106 with a positive charge field, +e, on the upper right quadrant 122 and the upper left quadrant 123.

(h) Applying a negative charge field, –e, on the negative plate 139 will attract all the massive members 106 with a negative charge field, +e, on the upper left quadrant 123 and the upper right quadrant 122.

(i) The charges reduce to zero as they arrive at the horizontal plane of symmetry, but until then, they have charges induced by their mass.

(j) The massive members exactly on the horizontal plane of symmetry through the axis of rotation will have a net zero residual charge and the positive plate 128 and the negative plate 139 will not act on them. These two massive members 106 with a zero charge will pass freely past the positive plate 138 and the negative plate 139.

With the above arrangement, attractive forces, $F_A$, and repulsive forces $F_R$ acts on the massive members 106 with an attraction and a repulsion cycle that creates rotation. This can generate a rotation in the clockwise direction. When the power switch 140 is turned on, the process of rotation can continue until the power source 116 is deplete. Hence a gravito-electrostatic motor is created.

Advantageously, a torque is generated by the attraction and repulsion. This torque will rotate the massive members 106 and rotate the shaft member 103 in a clockwise direction. It is important to note that this is not a perpetual motion situation, since the prelusive and attractive forces, do work on the massive members 106 using the electric fields. The apparatus 10 according to the second embodiment is similar to an electromagnetic motor which uses magnetic polarity instead of electric polarity. Here, gravitational force polarity is at work. The tensile and compressive forces generate a charge polarity variation between the upper and the lower quadrants resulting in a sinusoidal alternating current on the contact disc member 112.

To understand the power flow of the apparatus 10, consider the starting charge of the contact disc member 112 to be zero. Thus, the apparatus 10 only has a static charge that will repel like charges and attract unlike charges without the current flow from the power source 116 to the contact disk member 112. This allows us to map the flow of charges through the apparatus 10. Let there be a total of 20 massive members 106, for example, with each quadrant having an equal number of 9 unshared massive members 106. There is one massive member 106 shared by any two quadrants. The massive members 106 are treated as follows:

iv. The upper quadrants have 9 unshared members with a net positive charge $+e_m$
v. The lower quadrants have 9 unshared members with a net negative charge $-e_m$.
vi. The two horizontal massive members 106 have zero charges.

Denote $\pm e_D$, as an induced charge on the contact disc member 112, $\pm e_{F1}$; as an induced charge on the piezoelectric crystal first end face 108; $\pm e_{F2}$, as an induced charge on the piezoelectric crystal second end face 109; and; $\pm e_m$, as an induced charge on a massive member 106. The sum of all induced charges $\pm e_m$, appear on all the crystals, and thus generate a sum of induced charges $\mp e_D$, on the contact disc member 112 as follows:

$$\begin{array}{l}[+e_D] \to [-e_{F1} \ldots +e_{F2}] \ldots [-e_m] \\ [-e_D] \to [+e_{F1} \ldots -e_{F2}] \ldots [+e_m]\end{array} \to [+0_D] \text{ Disc} \quad \text{equation (1)}$$

However, this is an alternating current in the contact disc member 112 as it rotates. This generates an alternating magnetic field perpendicular to the rotational motion. This magnetic field cancels for both the upper quadrant hemispheres and the lower quadrant hemispheres.

The 9 massive members 106 on the upper quadrants have a net positive charge gain $+e_m$ that must be burrowed from the contact disc member 112, leaving the contact disc member 112 induced with a negative charge:

$$[-e_D]-[+e_{F1} \ldots -e_{F2}] \ldots [+e_m]\text{Upper Quadrant} \quad \text{equation (2)}$$

As each massive members 106 comes to the horizontal plane of symmetry, it loses all stresses. Each massive member 106 that comes to the horizontal plane of symmetry through the axis of rotation will lose it positive charge. Its charge will be, $\pm e_m = 0$. This burrowed charge is returned back from the massive members 106 to the contact disc member 112.
The massive members 106 in the lower quadrants have an induced net negative charge, $-e_m$ burrowed again from the contact disc member 112, leaving the contact disc member 112 induced with a positive charge:

$$[+e_D] \to [-e_{F1} \ldots +e_{F2}] \ldots [-e_m]\text{Lower Quadrants} \quad \text{equation (3)}$$

Summing equations (1), (2) and (3) leaves a net zero charge on the disc contact member 112. However, this flow of charges to and from the contact disc member 112 is an alternating current of positive and negative charges flows and rotates with the contact disc member 112. This alternating current is superimposed at all points of the disc as a sinusoidal current varying in magnitude at each point with time as the disc rotates. It is clear that if this process continues, the contact disc member 112 will build up heat. Thus, the power source 116 will also experience a depletion as it does work on the contact disc member 112. When the power switch 140 is turned on, the process of rotation can continue until the power source 116 is deplete. As distinct from an electromagnetic motor, the apparatus 10 is a gravito-electrostatic motor.

Third Embodiment of the Invention

An apparatus 10 comprising a rotatable shaft member 103 centered on an axis in a horizontal plane to rotate in a balanced state in a fixed housing members 117; a non-conductive member 113 attached to said shaft member 103 to rotate in a plane perpendicular to said axis of rotation; said non-conductive member 113 having a multiplicity of conduits 130 each carrying a cable 120 as shown in FIGS. 11, 12, and 13. Cables 120 are each attached conductively to a piezoelectric crystal first electrical contact 108a with the other end attached to a contact ring member 115; such that said contact ring member 115, said a cable 120 and said piezoelectric crystal 100 rotate with said shaft member 103; a multiplicity of leaf spring contacts 114 attached to said housing member 117; each said leaf spring contact 114 tangentially contacting one contact ring member 115; an output terminal 141 is connected to each said leaf spring member 114 for taking a current out of the housing member 117; such that when a motor rotates the shaft member 103 each massive member 106 rotates and its gravitational stresses induces a voltage on said piezoelectric crystal 100 attached to it and the cable 120 takes the voltage to a contact ring member 115 and the contact ring member 115 transmits the voltage to a leaf spring 114 and said leaf springs 114 transmits the currents to an output for use as a power source.

A third embodiment of the invention converts the apparatus 10 to a generator with multiphase current outputs 141. Using an external motor (not shown) to rotate the shaft member 103 of the apparatus 10 shown in FIG. 11, the rotating massive members 106 impart gravitational stresses that results in an extension and a contraction of each piezoelectric crystal body 110, of the apparatus 10. As shown in FIG. 11, the contact disc member 112 of the prior embodiments is replaced by a non-conducting disc member 113. Non-conducting disc member 113 is a plastic disc formed with conduits channels 130 that allow cables 120 to take the currents generated by the piezoelectric crystal first end face 108 from each crystal to connect to a contact ring 115 which connects with a leaf spring contacts 114 to independent outputs 141.

It is clear that these gravitational residual voltages already perform great function in their use for scales and accelerometers. They can also do functions for the apparatus 10, such as creating a resonant circuit that will oscillate sinusoidally to resonate with the applied voltage and generate more power by tuning the frequencies of rotation. Note that the static potential energy that these voltages create are significant, and in fact are proportional to the weights and accelerations they measure. It is this energy that is stored as potential in a poled crystal.

For example, the alternating currents will exist in all paired piezoelectric crystal first end face 108 output currents. In essence it is an $$\frac{n}{2} - \text{phase}$$

generator system, is created.

Note that electronic lighters use the compressive forces on crystals to generate a current that sparks a lot of energy to burn a fuel.

To understand the power flow of the apparatus 10, consider the starting charge of the piezoelectric crystal first end face 108 output to be zero when it is in the horizontal plane of symmetry where there are no external stresses on the piezoelectric crystal 100. Thus, the massive member s 106 for this position is on the horizontal plane of symmetry. This allows us to map the flow of charges through the apparatus 10. The massive members 106 generate charges as follows:

vii. The upper quadrants have $$\frac{n-2}{2}$$

unshared members with a net positive charge $+e_m$ viii. The lower quadrants have $$\frac{n-2}{2}$$

unshared members with a net negative charge $-e_m$.

ix. The two horizontal massive members 106 have zero charges.

Denote $\pm e_D$, as an induced charge on the cable 120 from piezoelectric crystal first end face 108 output; This charge varies for each crystal as it rotates due to the sinusoidal stresses and tensions exerted by the massive members 106 under the actions of gravity.

In all the cases, $$\frac{n}{2}$$

sinusoidal, gravitational AC voltages, will be present in n diametrically opposite piezoelectric crystals 100 as a result of the gravitational field stresses acting on n-massive members 106. These currents have a phase difference Ø, given in radians, by the relation, $$\phi = \frac{2\pi}{n}$$

This phases difference of voltages, appears as $$\frac{n}{2},$$

alternating currents generated by the apparatus 10. These voltage outputs can be used to perform external work. They can also be combined and permutated in various combinations to generate couplings of the $$\frac{n}{2}$$

phases. Advantageously, the gravitational field stresses act like a generator in the apparatus 10 with positive and negative charges induced on diametrically opposed piezoelectric crystal body 110.

If the angular position θ, at a time t=0, from start of motion of a given massive member 106, is given by θ=ωt, where, ω, is the angular speed of rotation. θ=0, at the topmost position, the net gravitational voltage, $V_G$, generated on the actuated massive member 106, and thus to its piezoelectric crystals 100 will be given by the effective of each of the phases is given by, neglecting the centrifugal tensions:

$$V = V_G \sin\left(\omega t + \frac{2\pi k}{n}\right)$$

Where, k is the $k^{th}$ pair from the vertical plane. The upper half piezoelectric crystals 100 of the apparatus 10 will have a net charge opposite to those in the lower half of the apparatus 10, due to the asymmetry of the gravitational field stresses and tensions on the piezoelectric crystals 100. However, the net applied voltage $V_A$, on all the piezoelectric crystals 100 vary in a sinusoidal manner, as mentioned earlier. Opposite massive members 106 generate opposite voltages. Then, paired rotating contact rings 115 can be connected with a pair of cables 120 that are attached to each pair of diametrically opposite piezoelectric crystal first end face 108 to carry their currents respectively. Each such paired outputs 140 can be tapped by isolated pairs of leaf spring contacts 114 held by housing member 117 to bring these signals from the contact rings 115 as they rotate, to outputs 141. Advantageously, for n-massive members 106, there is now $$\frac{n}{2} - \text{phases}$$

of alternating currents available from the apparatus 10 as the shaft member 103 is rotated by an external motor (not shown). The apparatus 10 in in embodiment acts as a gravito-electric generator.

I claim:

1. A gravito-electric motor, comprising:
   a shaft member rotatably mounted and centered on an axis to rotate in a balanced state;
   a contact member that is electrically conductive attached to said shaft member to rotate with said shaft member in a plane perpendicular to the axis of rotation of said shaft member, said contact member being in a dynamically and statically balanced state;
   said contact member having a boundary surface with a plurality of surface segments, each of said plurality of surface segments being connected to a surface of a piezoelectric crystal;
   an equal number of electrically conducting massive members, each of said electrically conducting massive members being connected to another surface of said piezoelectric crystal;
   all said electrically conducting massive members and said contact member and said piezoelectric crystal being in a state of dynamic and static balance with said shaft member; and
   an electrical voltage source with two opposite voltage polarities, one of said two opposite voltage polarities conductively being applied to at least one electrically conducting massive member that is not in a vertical radial location, and the opposite voltage polarity conductively being applied to said contact member;
   wherein when the electrical voltage source is turned on, an electrical voltage difference is created, and is applied conductively to said at least one electrically conducting massive member that is not in a vertical radial location, and to the contact member; and this electrical voltage difference is received by the piezoelectric crystal connected to said at least one electrically conducting massive member; and wherein the piezoelectric crystal can one of extend and contract;

and wherein the piezoelectric crystal moves in order to move said at least one electrically conducting massive member radially to create an imbalance on the shaft member;

and said imbalance will rotate said shaft member; and wherein upon removal of said applied electrical voltage difference the piezoelectric crystal returns the electrically conducting member to its original radial location to remove the imbalance, and said balance and imbalance can be repeated on any electrically conducting massive member that is not in a vertical radial location to achieve rotations of the shaft member.

2. The gravito-electric motor of claim 1, wherein said piezoelectric crystal has at least two flat surfaces.

3. The gravito-electric motor of claim 1, wherein said piezoelectric crystal is made from ceramic material.

4. The gravito-electric motor of claim 1, wherein said contact member is made from a conductive metal.

5. The gravito-electric motor of claim 1 wherein said electrically conducting massive members are formed of metal.

6. The gravito-electric motor of claim 1, wherein said contact member is an annular cylinder with at least one flat segment on its boundary surface.

7. The gravito-electric motor of claim 1, wherein said contact member is a thin metal annular cylindrical shape with at least one flat segment.

8. The gravito-electric motor of claim 1, comprising a plurality of said piezoelectric crystal.

9. The gravito-electric motor of claim 1, comprising a plurality of electrically conducting massive members.

10. A gravito-electric motor, comprising:
a shaft member rotatably mounted and centered on an axis to rotate in a balanced state;
a plurality of contact members electrically and conductively attached to said shaft member to rotate with said shaft member in a plane perpendicular to the axis of rotation of said shaft member;
said plurality of contact members being in a dynamically and statically balanced state;
each of said plurality of contact members having a boundary surface connected to a surface of a piezoelectric crystal;
an equal number of electrically conducting massive members; each of said electrically conducting massive members connected to another surface of said piezoelectric crystal, and in combination, each of said contact members and each of said electrically conducting massive members and each of said piezoelectric crystals being in a state of dynamic and static balance with said shaft member;
and a positive plate capacitively holding a positive charge;
and a negative plate capacitively holding a negative charge, said positive plate being positioned vertically and distributed equally above and below the horizontal plane passing through the axis of rotation of said shaft member and at a radial location in the proximity of said electrically conducting massive members and said negative plate being positioned vertically and distributed equally above and below the horizontal plane passing through the axis of rotation of said shaft member and at a radial location diametrically equal and opposite to the radial location of said positive plate, and said positive plate at a radial location other than a radial distribution of said electrically conducting massive members; and
wherein when a massive member above the horizontal plane compresses a piezoelectric crystal attached to it and induces a voltage difference on said piezoelectric crystal, and wherein one polarity of said induced voltage difference is electrically transmitted to the massive member above the horizontal plane; a massive member below the horizontal plane compresses a piezoelectric crystal attached to it and induces a voltage difference on said piezoelectric crystal, and wherein one polarity of said induced voltage difference is electrically transmitted to the massive member below the horizontal plane;
an electrical voltage source with a positive and negative voltage polarities respectively;
said positive polarity conductively applied to said positive plates and said negative polarity conductively applied to said negative plate, wherein when the electrical voltage source is turned on, a positive electrical field is generated on the positive plate, and a negative electrical field is generated on the negative plate;
and the positive plate will attract the massive members with a negative polarity and the negative plate will attract the massive members with a positive charge and the positive plate will repel the massive members with a positive polarity and the negative plate will repel the massive members with a negative charge;
wherein the attraction and repulsion of the massive members will cause them to rotate and thereby generating a torque on said shaft member.

11. The gravito-electric motor of claim 10, wherein said piezoelectric crystal is polarized to generate a voltage difference when stressed by compressive stresses and an opposite voltage difference when stressed by tensile stresses.

12. The gravito-electric motor of claim 10, wherein said massive members have a geometric shape with at least one flat surface.

13. A gravito-electric motor, comprising:
a shaft member centered on an axis in a horizontal plane to rotate in a balanced state in a fixed housing;
a non-conductive member having a non-conductive shaft member collar attached to said shaft member, and a plurality of electrically separate contact members attached to said non-conductive shaft member collar to rotate with said shaft member in a plane perpendicular to said axis of rotation, said non-conductive member having a plurality of conduits each carrying a first cable and a second cable, a plurality of piezoelectric crystals attached to said non-conductive member and a massive member attached to each of said plurality of piezoelectric crystals;
wherein one end of each of said first cables being conductively attached to the massive member and the other end of each of said first cables being exclusively attached to a contact member; and wherein, one end of each of said second cables being conductively attached to a piezoelectric crystal and the other end of each of said second cables being exclusively attached to a contact member;
wherein said non-conductive member, said first and second cables and said plurality of piezoelectric crystals rotate with said shaft member in a dynamically balanced state;

a plurality of electrically separate leaf spring contacts attached to said fixed housing, each of said plurality of electrically separate leaf spring contacts tangentially contacting one of said plurality of electrically separate contact members;

an output terminal connected to each of said plurality of electrically separate leaf spring contacts for taking a current out of the fixed housing;

wherein when the gravito-electric motor rotates the shaft member, each massive member rotates and its gravitational stresses induce a voltage difference as two opposite polarities of voltage on the piezoelectric crystal attached to said massive member, and on the massive member itself, respectively; the plurality of electrically separate contact members transmit said voltage difference to said plurality of electrically separate leaf spring contacts; and said plurality of electrically separate leaf spring contacts transmit the voltage difference to said output terminals; and any two output terminals can be used as a polyphase electrical power source.

* * * * *